(12) United States Patent
Takubo

(10) Patent No.: US 7,650,874 B2
(45) Date of Patent: Jan. 26, 2010

(54) CONTROL APPARATUS FOR AN INTERNAL COMBUSTION ENGINE

(75) Inventor: Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 77 days.

(21) Appl. No.: 12/132,073

(22) Filed: Jun. 3, 2008

(65) Prior Publication Data

US 2009/0024304 A1 Jan. 22, 2009

(30) Foreign Application Priority Data

Jul. 17, 2007 (JP) ............................. 2007-185369

(51) Int. Cl.
*F02M 15/00* (2006.01)
*F02B 75/12* (2006.01)
(52) U.S. Cl. ..................... 123/434; 123/1 A; 123/494
(58) Field of Classification Search ................. 123/1 A, 123/689, 494, 672, 434
See application file for complete search history.

(56) References Cited

U.S. PATENT DOCUMENTS 5,901,671 A * 5/1999 Huff et al. ................. 123/1 A
6,041,278 A * 3/2000 Kennie et al. ............... 701/103
6,257,174 B1 * 7/2001 Huff et al. ................... 123/1 A

FOREIGN PATENT DOCUMENTS

JP 2004-245097 A 9/2004
JP 2004-278449 A 10/2004

* cited by examiner

*Primary Examiner*—John T Kwon
(74) *Attorney, Agent, or Firm*—Sughrue Mion, PLLC

(57) ABSTRACT

A control apparatus for an internal combustion engine can learn an alcohol concentration of fuel in a fuel tank according to air fuel ratio feedback control, and accurately calculate, even upon interruption of learning, an alcohol concentration in an injector by estimating an alcohol concentration change delay from the fuel tank to the injector. The alcohol concentration in the fuel tank is estimated based on an air fuel ratio correction amount calculated from an air fuel ratio detected. A delay behavior of an alcohol concentration change until the fuel in the fuel tank reaches the injector is estimated. The alcohol concentration of fuel supplied to the engine is calculated from the estimated alcohol concentration in the fuel tank and the estimated delay behavior. An alcohol concentration correction coefficient is calculated based on the alcohol concentration, and an amount of fuel supplied to the engine is corrected by the correction coefficient.

14 Claims, 11 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine, and in particular, to one for an automotive vehicle such as a so-called flexible fuel vehicle (FFV).

2. Description of the Related Art

There is a motor vehicle in the form of a so-called flexible fuel vehicle (FFV) which is able to travel also with a mixed fuel of various compositions of alcohol and gasoline, other than with gasoline alone.

Alcohol has the content of C (carbon) atoms differing with respect to that of ordinary gasoline (blended or mixed fuel), so when a blended fuel of alcohol and gasoline is supplied to an internal combustion engine used for the flexible fuel vehicle, it is necessary to adjust the amount of fuel to be injected according to the alcohol concentration in fuel.

In such a flexible fuel vehicle, there has hitherto been known one in which an estimation of the alcohol concentration in fuel is performed by using a correlation between the alcohol concentration and an air fuel ratio feedback correction coefficient that is calculated based on an air fuel ratio in an exhaust gas detected by an air fuel ratio sensor (see, for example, a first patent document: Japanese patent application laid-open No. 2004-245097).

There will be a delay until fuel in a fuel tank, of which the alcohol concentration has been changed due to refueling, arrives at an injector that supplies the fuel to an internal combustion engine, so the alcohol concentration of the fuel to be supplied from the injector changes with the delay. In addition, this delay becomes larger in a returnless fuel supply system.

According to the above-mentioned prior art, however, the alcohol concentration is calculated in real time from the air fuel ratio feedback correction coefficient, so it is possible to detect the change in the alcohol concentration of the fuel supplied from the injector without delay.

On the other hand, the delay of the change in the alcohol concentration until the fuel in the fuel tank arrives at the injector that supplies the fuel to the internal combustion engine is a prescribed delay that can be beforehand designed or calculated on the desk from the capacity of a fuel supply pipe, the capacity of an injector fuel supply tank, the flow rate of fuel in the fuel supply system, and so on.

In addition, the air fuel ratio feedback correction coefficient includes not only the influence of the change of the alcohol concentration but also the influence of the change of the air fuel ratio due to the introduction of a vaporized gas or due to the characteristic variation of fuel supply devices such as injectors, an air flow meter, etc. These influences are detected in a mixed manner, and in order not to cause false detection, the introduction of the vaporized gas is inhibited during detection of the alcohol concentration thereby to remove its resultant influence. Moreover, the detection of the characteristic variation of the fuel supply devices is also inhibited, so that the detection accuracy of the alcohol concentration can be improved.

According to the conventional methods, however, there has been a problem that it is necessary to estimate the alcohol concentration at all times during the time when the alcohol concentration of fuel to be supplied from an injector is changing, and trouble occurs if the estimation of the alcohol concentration is interrupted on the way thereof. For example, for a certain period of time after the engine is stopped and then restarted while the alcohol concentration is changing, the air fuel ratio sensor does not become activated, so the air fuel ratio feedback is stopped and the estimation of the alcohol concentration is also stopped. Therefore, the change in the alcohol concentration can not be temporarily detected, and variation in the air fuel ratio will occur. In addition, as the temperature of engine cooling water becomes low, the time until the air fuel ratio sensor is activated will be delayed very much, so a stop period for the estimation of the alcohol concentration becomes longer, and the air fuel ratio variation becomes larger, too.

Moreover, it is necessary to always perform the estimation of the alcohol concentration during the time when the alcohol concentration of the fuel to be supplied from the injector is changing, and accuracy in the air fuel ratio control is reduced upon interruption of the alcohol concentration estimation. As a result, it has been difficult to introduce vaporized gas or to perform air fuel ratio open-loop control such as enriching the air fuel ratio while interrupting the alcohol concentration estimation.

SUMMARY OF THE INVENTION

Accordingly, the present invention is intended to obviate the problems as referred to above, and has for its object to provide a control apparatus for an internal combustion engine which can learn a single composition (e.g., alcohol) concentration in a fuel tank that has first changed and then become stabilized immediately after the fuel tank has been refueled or refilled, by means of an air fuel ratio feedback correction coefficient, and hence can make the learned value of the single composition concentration stable in a short period of time after start of the learning, whereby the single composition concentration in a fuel supply device (e.g., injector) is calculated from the stabilized single composition concentration in the fuel tank and an estimated delay in the change of the single composition concentration along a fuel path from the fuel tank to the fuel supply device, thus making it possible to calculate the single composition concentration in the fuel supply device in an accurate manner even if the learning of the single composition concentration is interrupted due to stopping of the engine, introduction of a vaporized gas, and air fuel ratio open-loop control, and in which accuracy in the single composition concentration is maintained, so the introduction of the vaporized gas and the air fuel ratio open-loop control can be permitted even during the time when the single composition concentration in the fuel supply device is changing.

Bearing the above object in mind, according to the present invention, there is provided a control apparatus for an internal combustion engine which learns a concentration of a single composition of fuel in a fuel tank according to air fuel ratio feedback control, estimate a composition concentration change delay from the fuel tank to a fuel supply device, and calculates a concentration of the composition in the fuel supply device. The control apparatus includes: an air fuel ratio detection unit that is arranged in an exhaust system of the internal combustion engine for detecting an air fuel ratio in an exhaust gas from the internal combustion engine; an air fuel ratio correction amount calculation unit that calculates an amount of air fuel ratio correction for correcting an amount of fuel to be supplied in the fuel supply device based on the air fuel ratio detected by the air fuel ratio detection unit; an in-tank concentration learning unit that estimates the concentration of the single composition of fuel in the fuel tank based on the amount of air fuel ratio correction calculated by the air fuel ratio correction amount calculation unit; a fuel concentration change delay behavior estimation unit that estimates a delay behavior of a concentration change of the single composition until the fuel in the fuel tank, of which the concentration of the single composition has been changed due to refueling of the fuel tank, arrives at the fuel supply device; a supplied fuel concentration calculation unit that calculates the single composition concentration of fuel to be supplied to the internal combustion engine, from the single composition concentration of the fuel in the fuel tank learned by the in-tank concentration learning unit and the delay behavior of the single composition concentration change estimated by the fuel concentration change delay behavior estimation unit; and a fuel control unit that calculates a single composition concentration correction coefficient based on the supplied fuel concentration calculated by the supplied fuel concentration calculation unit, and corrects the amount of fuel supplied to the internal combustion engine by the single composition concentration correction coefficient thus calculated.

In the present invention, the single composition (e.g., alcohol) concentration in the fuel tank, which has first changed and then become stabilized immediately after the fuel tank has been refilled, is learned by means of the air fuel ratio feedback correction coefficient, so the learned value of the single composition concentration can be made stable in a short period of time after start of the learning, whereby the single composition concentration in the fuel supply device is calculated from the stabilized single composition concentration in the fuel tank and an estimated delay in the change of the single composition concentration along a fuel path from the fuel tank to the fuel supply device, thus making it possible to calculate the single composition concentration in the fuel supply device in an accurate manner even if the learning of the single composition concentration is interrupted due to stopping of the engine, introduction of a vaporized gas, and air fuel ratio open-loop control. In addition, accuracy in the single composition concentration is maintained, so the introduction of the vaporized gas and the air fuel ratio open-loop control can be permitted even during the time when the single composition concentration in the fuel supply device is changing.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described in detail while referring to the accompanying drawings.

Embodiment 1

Figure 1:
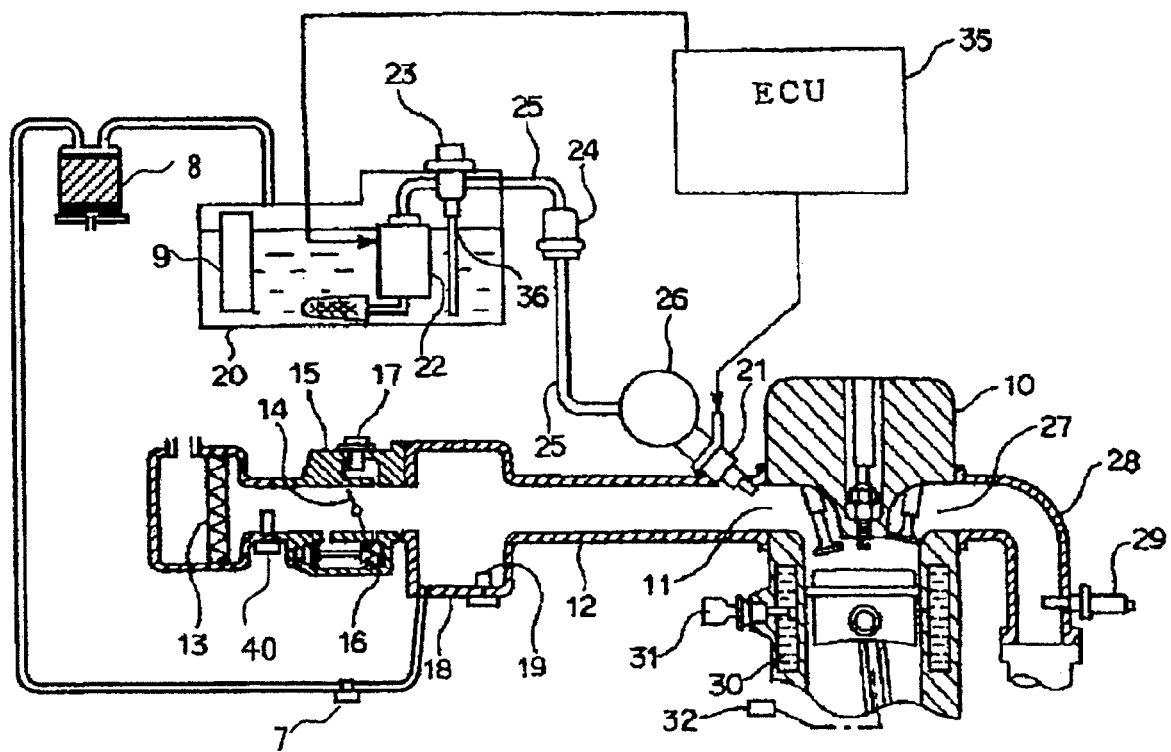
FIG. 1 is a block diagram schematically showing a control apparatus for an internal combustion engine according to a first embodiment of the present invention.

FIG. 1 shows the schematic construction of a control apparatus for an internal combustion engine according to one embodiment of the present invention. Here, note that the internal combustion engine illustrated in FIG. 1 is a kind of internal combustion engine that uses a fuel containing alcohol. An air cleaner 13 is arranged to be connected to one end or a most upstream portion of an intake pipe 12 which is connected at the other end thereof through an intake manifold to individual intake ports 11 of cylinders of an engine 10 that constitutes the above-mentioned internal combustion engine. An air flow meter 40 for detecting the amount of air sucked to the engine 10 is mounted on the intake pipe 12 at a location downstream of the air cleaner 13. Further, a throttle valve 14 is arranged in the intake pipe 12 at a location downstream of the air flow meter 40. In a throttle body 15 that receives the throttle valve 14, there are arranged an idle speed control valve 16 for adjusting the amount of intake air bypassing the throttle valve 14 and an intake pipe pressure sensor 17 for detecting the pressure in the intake pipe 12. A surge tank 18 is arranged to be connected to the intake pipe 12 at a location downstream of the throttle body 15. An intake air temperature sensor 19 for detecting the temperature of intake air is arranged in the surge tank 18.

In addition, in the vicinity of the intake ports 11 of the individual cylinders, there are arranged a plurality of injectors (fuel supply devices) that serve to inject the fuel supplied from the fuel tank 20 into the corresponding cylinders. The fuel in the fuel tank 20 is drawn up by a fuel pump 22, and is sent to a delivery pipe 26 that serves to supply the fuel to the injectors 21 while passing through a fuel supply pipe 25 via a pressure regulator 23 and a fuel filter 24, so that it is distributed from the delivery pipe 26 to the injectors 21 of the respective cylinders. The pressure regulator 23 has a back pressure chamber defined therein which is opened to the ambient atmosphere. A surplus of the fuel sent from the fuel pump 22 to the pressure regulator 23 is returned from a fuel return opening 36 of the pressure regulator 23 into the fuel tank 20.

The fuel supply system as described above becomes a returnless fuel supply system in which a return pipe for returning the surplus fuel from the delivery pipe 26 into the fuel tank 20 is abolished, and fuel piping in the form of the fuel supply pipe 25 terminates at the delivery pipe 26.

In addition, a fuel level gage 9 for detecting the liquid level of fuel in the fuel tank 20 is installed in the fuel tank 20 to detect the fuel level therein.

A water temperature sensor 31 for detecting the temperature of engine cooling water is mounted on a water jacket 30 that serves to cool the engine 10. Further, the number of revolutions per minute of the engine 10 is detected by the frequency of a pulse signal which is output from a crank angle sensor 32 at every predetermined crank angle.

By means of an injection command signal from an engine control unit 35 (hereinafter referred to as an "ECU") which comprises a computer including a central processing unit (CPU), a read only memory (ROM), a random access memory (RAM), a backup RAM, an electrically erasable programmable ROM (EEPROM), etc., all of them being not shown, the injectors 21 are operated to supply and inject fuel into intake air in accordance with the operating condition of the engine 10 in such a manner that the air fuel ratio of an air fuel mixture in the engine 10 can be controlled to a predetermined air fuel ratio. On the other hand, an oxygen concentration sensor (air fuel ratio detection unit) 29 for detecting the air fuel ratio of an exhaust gas discharged from the engine 10 is mounted on an exhaust pipe 28 that is connected through an exhaust manifold to individual exhaust ports 27 of the cylinders of the engine 10. A three-way catalyst (not shown) for purifying the exhaust gas is arranged to be connected to the exhaust pipe 28 at a location downstream of the oxygen concentration sensor 29. When the air fuel ratio lies within a so-called specific window that is defined around a stoichiometric air fuel ratio, the three-way catalyst is able to purify NOx, HC and CO in the exhaust gas at the same time with maximum processing efficiency. As a result, the ECU 35 controls the air fuel ratio of the exhaust gas in a feedback manner based on an output from the oxygen concentration sensor 29 arranged at the upstream side of the three-way catalyst, in such a way that the air fuel ratio of the exhaust gas varies within the range of the above-mentioned specific window. Here, it is to be noted that the ECU 35 performs a variety of kinds of control on the internal combustion engine based on signals output from various kinds of sensors such as the oxygen concentration sensor 29, other sensors related to internal combustion engine control, etc.

The fuel containing alcohol has the contents of C (carbon) atoms and O (oxygen) atoms differing with respect to those of ordinary gasoline, so in order to obtain the same equivalence ratio of the alcohol-containing fuel as that of ordinary gasoline, a larger amount of fuel injection is required. Thus, when the blended fuel of alcohol and gasoline is supplied to the engine, it is necessary to adjust the amount of fuel injection in accordance with the alcohol concentration in the fuel. Accordingly, by using the value of the alcohol concentration detected by the oxygen concentration sensor 29, the alcohol concentration in the fuel is estimated, so that it is reflected on the amount of fuel to be injected.

In addition, a canister 8 is connected to the fuel tank 20 so that the vaporized gas generated from the fuel in the fuel tank 20 is adsorbed in the canister 8. Also, the canister 8 is connected through a valve 7 to the intake pipe 12 in such a manner that at the time of introduction of the vaporized gas into the intake pipe 12, the valve 7 is opened by means of the ECU 35, and the vaporized gas that has been adsorbed by the canister 8 is introduced into the intake pipe 12.

In this embodiment, the alcohol concentration in the fuel is estimated as a single composition concentration in the fuel by the use of a correction coefficient of air fuel ratio feedback control (air fuel ratio correction amount) using the detected air fuel ratio of the oxygen concentration sensor 29 and an alcohol concentration change delay coefficient representing the delay of the alcohol concentration change in the returnless fuel supply system.

Moreover, the air fuel ratio feedback correction coefficient includes, in a mixed manner, not only the influence of the change of the alcohol concentration but also the influence of the change of the air fuel ratio due to the introduction of the vaporized gas or due to the characteristic variation of fuel supply devices such as the injectors, the air flow meter, etc. These influences are detected in a mixed manner, alcohol concentration learning, vaporized gas introduction control, learning control of the characteristic variation of the fuel supply devices, and air fuel ratio open-loop control are appropriately set with respect to one another in consideration of the behavior of the alcohol concentration change delay and the behavior of the alcohol concentration learning in the fuel tank so as not to cause false detection.

Figure 2:
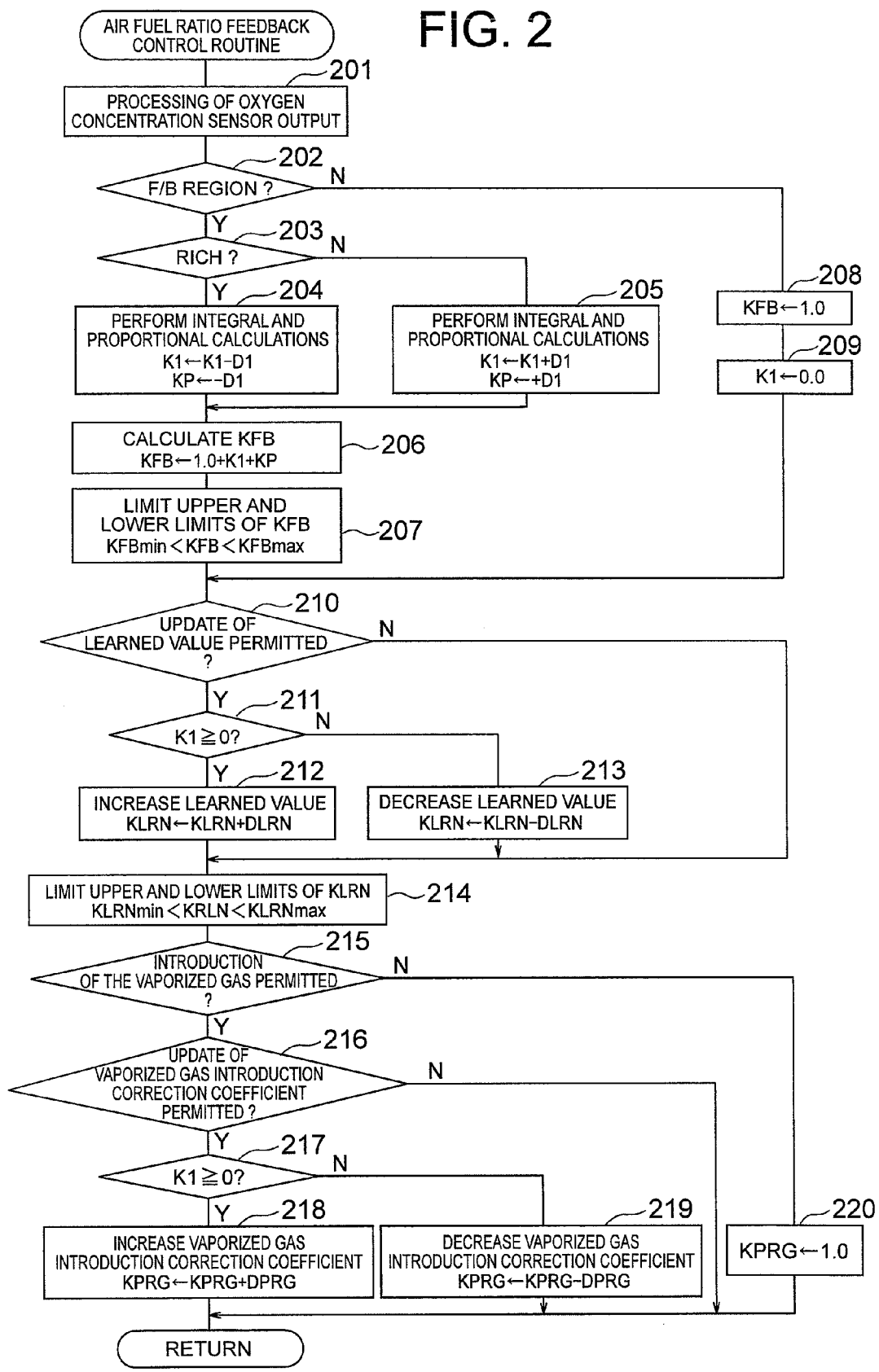
FIG. 2 is an operational flow chart showing one example of the operation of air fuel ratio feedback control performed by an ECU of FIG. 1.

FIG. 2 is an operational flow chart showing one example of the operation of air fuel ratio feedback control performed by the ECU 35. This flow chart shows an air fuel ratio feedback control routine which calculates an air fuel ratio correction coefficient KFB, etc., for air fuel ratio feedback control using the oxygen concentration sensor 29, and which is executed every predetermined period of time, e.g., 5 ms. Here, note that various factors, maps, flags, etc., necessary for the processing to be described below are set and stored in a storage part of the ECU 35, and are updated as appropriate (and so forth).

In FIG. 2, symbols "Y", "N" at branched portions from each determination process represent determination results "Yes", "No" of the determination process, respectively. First of all, in step 201, an output voltage V1 of the oxygen concentration sensor 29 is taken in after being converted from analog into digital form (processing of sensor output information).

In step 202, it is determined whether a closed-loop (feedback: F/B) condition of the air fuel ratio detected by the oxygen concentration sensor 29 holds. That is, it is determined whether the air fuel ratio is in a feedback region. For example, in either case where the engine 10 is under air fuel ratio control conditions other than stoichiometric air fuel ratio control (e.g., during engine starting, during fuel enriching control at low water temperatures, during fuel enriching control for increasing power under high load, during fuel leaning control for improvements in fuel consumption or mileage, during fuel leaning control after engine starting, during fuel cut operation, and so on), or where the oxygen concentration sensor 29 is in an inactive state, or where the oxygen concentration sensor 29 fails, a closed-loop condition does not hold, and in the other cases, the closed-loop condition holds.

When the closed-loop condition does not hold, the control process proceeds to step 208 where the air fuel ratio correction coefficient KFB is adjusted to 1.0. Then, in step 209, an integral calculation value KI is reset to 0.0.

On the other hand, when the closed-loop condition holds, feedback control according to proportional and integral arithmetic calculations is carried out in steps 203 through 206. In step 203, the output V1 of the oxygen concentration sensor 29 is compared with a target voltage VF1, whereby a rich/lean determination is made. When V1 is equal to or greater than VF1 and hence the detected air fuel ratio is rich, the control process proceeds to step 204, whereas when V1 is less than VF1 and hence the detected air fuel ratio is lean, the control process proceeds to step 205.

When the detected air fuel ratio is rich, then in step 204, the integral calculation value KI and a proportional calculation value KP are decreased in the following manner so as to reduce the amount of fuel to be injected.

$$KI \leftarrow KI-DI$$

$$KP \leftarrow -DP$$

A gain DI for the integral calculation value KI and a gain DP for the proportional calculation value KP are set to appropriate values for each operating condition of the engine 10 in such a manner that good feedback performance can be obtained.

On the other hand, when the air fuel ratio is lean, then in step 205, the integral calculation value KI and the proportional calculation value KP are increased in the following manner so that the amount of fuel to be injected can be increased.

$$KI \leftarrow KI+DI$$

$$KP \leftarrow +DP$$

In step 206, the air fuel ratio correction coefficient (i.e., air fuel ratio correction amount) KFB, which is a fuel correction coefficient, is calculated as follows.

$$KFB \leftarrow 1.0+KI+KP$$

Thereafter, the control process proceeds to step 207 where processing of defining an upper limit and a lower limit of the air fuel ratio correction coefficient KFB is performed as follows.

$$KFBmin < KFB < KFBmax$$

By processing in this manner, an excessively large quantity of air fuel ratio operation can be prevented, thereby making it possible to prevent deterioration of drivability and so on.

From step 210 to step 214, a learned value of the air fuel ratio correction coefficient KFB and a learning correction coefficient KLRN are calculated. Such learning control is performed so as to compensate for the aging and production variation of the injectors 21. Specifically, for example, such compensation is carried out for the change in the characteristic of the injectors 21, an error in the detected amount of air of the air flow meter 40. In case where there are no characteristic change of the injectors 21 and no error of the air flow meter 40, the center of the air fuel ratio correction coefficient KFB is designed to be equal to 1.0, but as the characteristic change occurs, it is going to deviate from 1.0. The learning control serves to compensate for this deviation from 1.0 of the air fuel ratio correction coefficient KFB by means of the learned value and the learning correction coefficient KLRN so as to keep the center of the air fuel ratio correction coefficient KFB to 1.0.

In step 210, it is determined whether a condition of updating the learning correction coefficient KLRN holds. Such an update permission condition includes "during the above-mentioned air fuel ratio feedback control", "the condition for the engine cooling water temperature", "at the time when the vaporized gas is not being introduced", "at the time when the alcohol concentration is not changing", etc. The condition for the alcohol concentration change is such that when an update permission flag FFBLRN to be described later is 1.0, it is determined that the update of the learning correction coefficient KLRN is permitted. When updating of the condition for the alcohol concentration change is permitted, the control process proceeds to step 211, whereas it is inhibited, the control process proceeds to step 214.

In step 211, it is determined whether the integral calculation value KI is equal to or greater than 0. When KI is equal to or greater than 0, the control process proceeds to step 212, whereas when smaller than 0, the control process proceeds to step 213. When KI is equal to or greater than 0, it is indicated that the amount of fuel injected by each of the injectors 21 is decreased, and in step 212, the learning correction coefficient KLRN is increased by the update gain DLRN. When, on the other hand, KI is smaller than 0, then in step 213, the learning correction coefficient KLRN is decreased by the update gain DLRN. The update gain DLRN is set to be sufficiently smaller than the above-mentioned integral calculation update gain Di, so that the change rate or speed of the learning correction coefficient KLRN can be prevented from becoming too much large in comparison with the change rate or speed of the air fuel ratio correction coefficient KFB. In addition, the learning correction coefficient KLRN is held for each engine operating condition, so that it can absorb the tendency difference of the characteristic variation due to the engine operating conditions.

Then, the control process proceeds to step 214 where processing of defining an upper limit and a lower limit of the learning correction coefficient KLRN is performed as follows.

$$KLRNmin < KLRN < KLRNmax$$

An excessively large fuel operation can be prevented by the above-mentioned calculation processing, thereby making it possible to prevent deterioration of drivability, etc. In addition, when KLRN reaches the upper or lower limit, there will be a possibility that some trouble might have occurred in the fuel feed system, so it is used for failure determination.

From step 215 to step 220, a vaporized gas introduction correction coefficient KPRG for compensating for the change in the air fuel ratio due to the vaporized gas introduced into the intake pipe 12 is calculated.

In step 215, it is determined whether a condition for introducing the vaporized gas holds. When the vaporized gas is being introduced, i.e., when the vaporized gas introduction condition holds, the control process proceeds to step 216, whereas when the vaporized gas is not being introduced, the control process proceeds to step 220 where the vaporized gas introduction correction coefficient KPRG is reset 1.0, and the arithmetic calculation routine is terminated.

In step 216, it is determined whether a condition of updating the vaporized gas introduction correction coefficient KPRG holds. Such an update permission condition includes "during the above-mentioned air fuel ratio feedback control", "the condition for the engine cooling water temperature", "at the time when the alcohol concentration is not changing", etc. The condition for the alcohol concentration change is such that when an update permission flag FPRGLRN to be described later is 1.0, it is determined that the update of the vaporized gas introduction correction coefficient KPRG is permitted. When the update is permitted, the control process proceeds to step 217, whereas when it is inhibited, the arithmetic calculation routine is terminated.

In step 217, it is determined whether the integral calculation value KI is equal to or greater than 0. When KI is equal to or greater than 0, the control process proceeds to step 218, whereas when KI is smaller than 0, the control process proceeds to step 219. When KI is equal to or greater than 0, it is indicated that the variation of a lean air fuel ratio is caused by the introduction of the vaporized gas, so in step 218, the vaporized gas introduction correction coefficient KPRG is increased by an update gain DPRG. When, on the other hand, KI is smaller than 0, then in step 219, the vaporized gas introduction correction coefficient KPRG is decreased by the update gain DPRG. The update gain DPRG is set to be sufficiently smaller than the above-mentioned gain DI for the integral calculation KI, so that the change rate or speed of the vaporized gas introduction correction coefficient KPRG can be prevented from becoming too much larger in comparison with the change rate or speed of the air fuel ratio correction coefficient KFB. In addition, in case where the introduction of the vaporized gas is inhibited in step 215, KPRG may be held at another variable before the vaporized gas introduction correction coefficient KPRG is reset to 1.0, and when the introduction is changed from inhibition into permission, that variable may be used as an initial value of KPRG.

An amount of fuel Qfuel1 to be supplied the engine 10 is set acceding to the following expression by using a basic amount of injection Qfuel0 for an alcohol concentration of 0%, an alcohol concentration correction coefficient KAL to be described later, the air fuel ratio correction coefficient (fuel correction coefficient) KFB, the learning correction coefficient KLRN, and the vaporized gas introduction correction coefficient KPRG.

$Q\text{fuel1} = Q\text{fuel0} \times KAL \times KFB \times KLRN \times KPRG$

Here, Qfuel0 is a basic fuel amount for an alcohol concentration of 0%, and is calculated according to the following expression.

Figure 3:
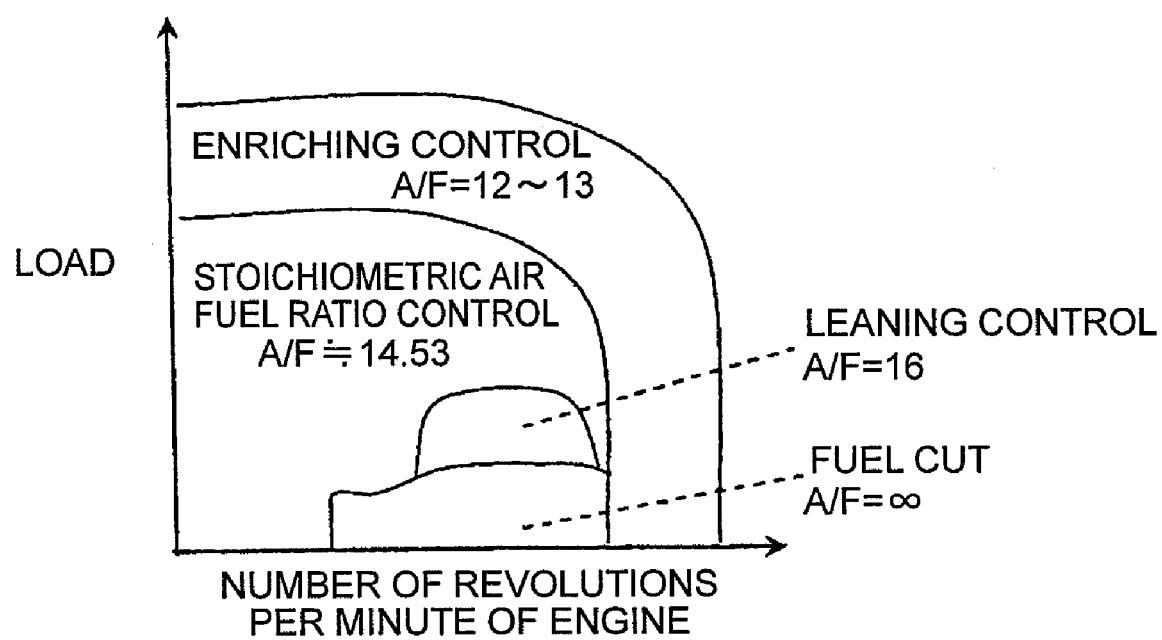
FIG. 3 is a view showing one example of a two-dimensional map of the number of engine revolutions per minute and an engine load in the control apparatus for an internal combustion engine according to the present invention.

$Q\text{fuel0} = Q\text{acyl}/\text{target air fuel ratio}$ where Qacyl is an amount of air supplied to the engine 10 that is calculated based on an amount of intake air qa detected by the air flow meter 40, and the target air fuel ratio is an air fuel ratio at the alcohol concentration of 0%, and is set to an air fuel ratio that is set in a two-dimensional map (stored in the ECU 35) of the number of engine revolutions per minute and the engine load, as shown in FIG. 3.

In addition, the amount of intake air qa may be obtained or calculated in accordance with an output of the intake pipe pressure sensor 17, or the rotational speed of the engine 10 obtained from the crank angle sensor 32, or the degree of opening of the throttle valve 14 and the rotational speed of the engine 10, or the opening and closing timing and an amount of lift of each intake valve and each exhaust valve of the engine 10.

Figure 4:
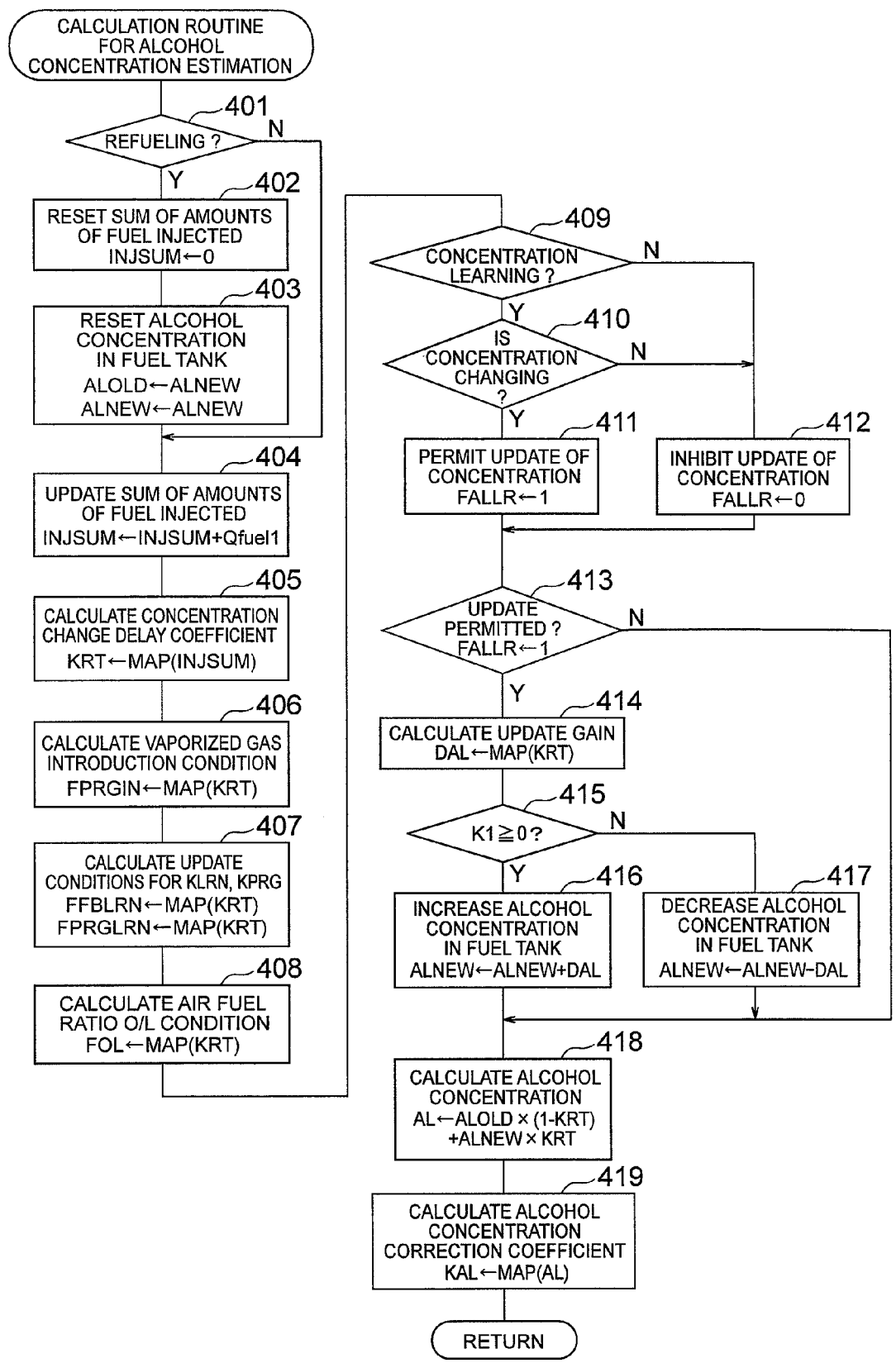
FIG. 4 is an operational flow chart showing one example of the operation of estimating the concentration of alcohol performed by the ECU of FIG. 1.

FIG. 4 is an operational flow chart showing an alcohol concentration estimating operation performed by the ECU 35. This figure shows an alcohol concentration estimating arithmetic calculation routine which estimates an alcohol concentration AL in an injector from an estimated value of an alcohol concentration in the fuel tank and an estimated delay in change of the alcohol concentration along a fuel path from the fuel tank to the injector, and calculates an alcohol concentration correction coefficient KAL, and which is executed at every predetermined time, e.g., 5 ms.

In step 401, it is determined whether the fuel tank 20 has been refilled. This determination is made based on an output change in the fuel level gage 9 inside the fuel tank 20, etc. When an amount of increase in the fuel level within a predetermined period of time becomes equal to or more than a predetermined amount, it is determined that the fuel tank 20 has been refueled or refilled with fuel, and the control process proceeds to step 402 where an initial value of the fuel level at the start of concentration learning is set. On the other hand, when it is determined that the fuel tank 20 has not been refueled, the control process proceeds to step 404.

Also, a refueling determination may be made by monitoring the change in the fuel level gage 9 when a vehicle having the engine 10 mounted thereon is stopped because the output of the fuel level gage 9 is varied to provide an incorrect determination due to the variation of the liquid level in the fuel tank 20 during traveling of the vehicle. Moreover, such a refueling determination can be made by the change of an output of a sensor such as an opening and closing sensor for a filler cap of the fuel tank, a detection sensor for a fuel service nozzle, a tank internal pressure sensor, a fuel property sensor (all not illustrated).

In step 402, a sum of amounts of fuel injected after refueling (a totalized or integrated amount of fuel injected after refueling) INJSUM is reset to 0. Then, in step 403, as shown below, an alcohol concentration ALOLD in the fuel tank 20 before the current refueling is set as an alcohol concentration ALNEW in the refueled fuel tank 20 calculated after the last refueling.

ALOLD←ALNEW

The alcohol concentration ALNEW in the fuel tank 20 after the current refueling can not be calculated at the time of the current refueling, so it is left at the value after the last refueling.

ALNEW←ALNEW

In step 404, the sum of amounts of fuel INJSUM injected after refueling is updated. That is, when fuel is supplied from the injectors 21, the sum of amounts of fuel INJSUM injected after refueling is increased by the fuel supply amount Qfuel1 in the following manner.

INJSUM←INJSUM+Qfuel1

In step 405, an alcohol concentration change delay coefficient KRT is calculated which represents the delay of the change in the alcohol concentration until the fuel in the fuel tank 20 with its alcohol concentration changed by refueling arrives at each injector 21 that supplies the fuel to the internal combustion engine.

Figure 5:
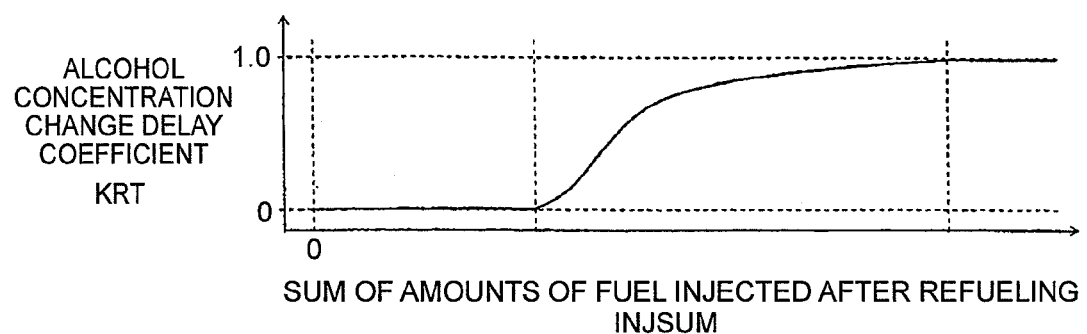
FIG. 5 is a view showing one example of a two-dimensional map of a sum of amounts of fuel injected after refueling and an alcohol concentration change delay coefficient in the control apparatus for an internal combustion engine according to the present invention.

The alcohol concentration change delay coefficient KRT is calculated in accordance with the sum of amounts of post-refueling injected fuel (the totalized amount of fuel injected after refueling) INJSUM by means of a two-dimensional map (stored in the ECU 35) shown in FIG. 5 (KRT←MAP(INJ-SUM)). Specifically, the alcohol concentration change delay coefficient KRT is set to 0 when the fuel in the injectors 21 is the fuel before refueling of the fuel tank 20, whereas the alcohol concentration change delay coefficient KRT is set to 1.0 when the fuel in the injectors 21 is replaced with the fuel in the fuel tank 20 after refueling of the fuel tank 20 completely or by 100%.

Figure 6:
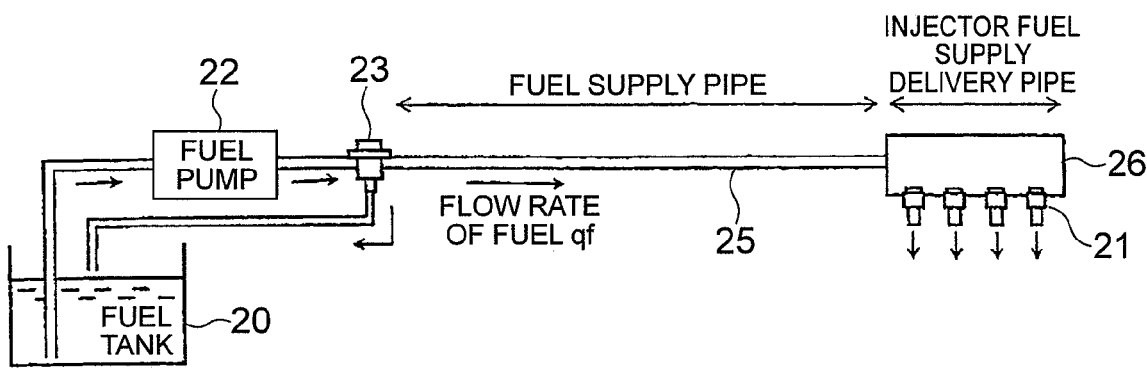
FIG. 6 is a view for explaining a returnless fuel supply system.

This alcohol concentration change delay coefficient KRT is set so as to match the delay of the fuel supply system. For example, in the returnless fuel supply system, as shown in FIG. 6, fuel in the downstream side of the pressure regulator 23 advances only by an amount of fuel injected by the injectors, so the delay of the alcohol concentration change is large. On the other hand, in the upstream side of the pressure regulator 23, fuel always circulates, and hence the delay of the alcohol concentration change is very small. Therefore, the delay of the alcohol concentration change from the fuel in the fuel tank 20 up to the fuel in the injectors 21 comprises the fuel transportation delay of the fuel supply pipe 25 in the downstream side of the pressure regulator 23 and the fuel transportation delay of the delivery pipe 26 for supplying fuel to the injectors 21. The fuel supply pipe 25 is composed of a relatively long and slender pipe, so the fuel transportation delay thereof becomes a dead time delay. On the other hand, the delivery pipe 26 for fuel supply is composed of a relatively fat pipe which is not long and slender, so the components of the fuel in the relatively fat delivery pipe 26 mix well with one another to become uniform, and the fuel transportation delay of the delivery pipe 26 can be represented by a filter delay nearly in the form of a first order delay.

Figure 17:
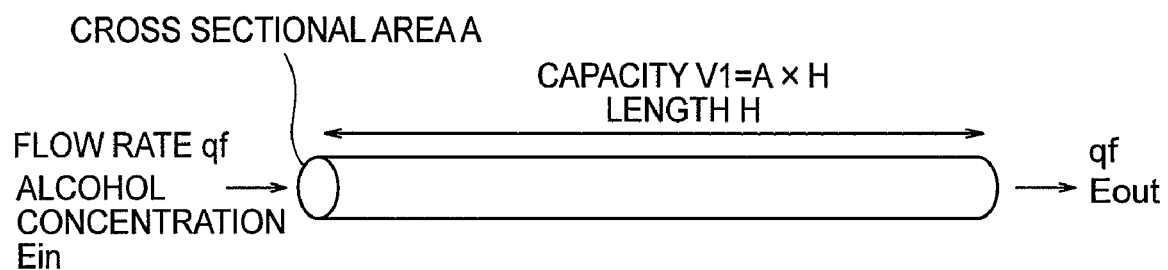
FIG. 17 is a view for explaining an alcohol concentration change delay in a fuel supply pipe in the present invention.

In the following, the concentration change delay of the fuel supply pipe 25 will be described, as shown in FIG. 17. An alcohol concentration Eout of the fuel output from the fuel supply pipe 25 becomes an alcohol concentration Ein of fuel input thereto after the lapse of a dead time T1, and is represented by the following expression.

$$Eout(t)=Ein(t-T1)$$

A relational expression of the dead time T1 will then be derived. A flow speed v of fuel in the fuel supply pipe 25 is represented by the following expression using a flow rate qf and a sectional area A.

$$v=qf/A$$

Assuming that the time taken for the fuel with the flow speed v to move from an inlet to an outlet of the fuel supply pipe 25 having a length of H is a time T1, the following expression is obtained.

$$H=\int_0^{T1} v\,dt = \int_0^{T1} qf/A\,dt$$

The following expression (1) for the dead time T1 is obtained from a pipe capacity V1=sectional area A×length H. Here, the flow rate qf is time varying (i.e., changes over time), and the dead time T1 is obtained by the numerical solution of an integral operation of the flow rate qf.

$$V1=\int_0^{T1} qf\,dt \quad (1)$$

Though the arithmetic calculation of the dead time T1, which is time varying due to changing of the flow rate qf, requires numerical calculation, time axis or base t is converted to an integrated flow rate so as to make the numerical calculation unnecessary. The integrated flow rate is defined as Qf in the following manner.

$$Qf=\int_0^t qf\,dt$$

This equation is differentiated with respect to time t as follows.

$$dQf/dt=qf$$

The following expression is obtained by assigning the above expression to expression (1) above and organizing it in an appropriate manner.

$$V1=\int_0^{T1} dQf = T1$$

In this manner, by converting the time base t to the integrated flow rate Qf, the dead time T1 becomes a fixed value of the pipe capacity V1, so numerical calculation such as the above expression (1) can be made unnecessary.

Figure 18:
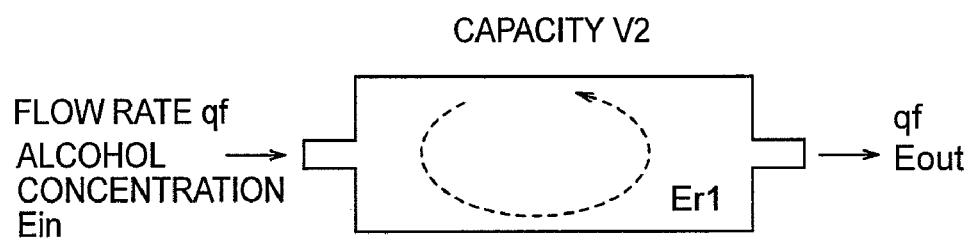
FIG. 18 is a view for explaining an alcohol concentration change delay in a delivery pipe in the present invention.

Next, the concentration change delay of the delivery pipe 26 for the injectors 21 will be described, as shown in FIG. 18. An alcohol concentration Er1 of fuel in the delivery pipe 26 is represented by the following expression (2) using a volume Va1 of an alcohol fuel component in the delivery pipe 26, a volume Vg of a gasoline fuel component in the delivery pipe 26, and a volume V2 of the delivery pipe 26.

$$Er1=Va1/(Va1+Vg)=Va1/V2 \quad (2)$$

Assuming that the change speed of the volume of the alcohol component flowing into the delivery pipe 26 is the product of the alcohol concentration Ein and the flow speed qf (i.e., Ein×qf) thereof, and the change speed of the volume of the alcohol component flowing out of the delivery pipe 26 is the product of the alcohol concentration Eout and the flow speed qf (i.e., Eout×qf) thereof, the following expression (3) is obtained.

$$dVa1/dt=Ein\times qf - Eout\times qf \quad (3)$$

In addition, with an assumption that the fuel components of the fuel in the delivery pipe 26 mix well with each other to provide uniform concentrations thereof, the alcohol concentration Er1 of fuel in the delivery pipe 26 and the alcohol concentration Eout of fuel flowing out therefrom become equal to each other.

$$Er1=Eout \quad (4)$$

Accordingly, by assigning the above expression (3) to the above expressions (2), (4) and organizing them in an appropriate manner, the change in the alcohol concentration of fuel flowing into and out of the delivery pipe 26 is represented by the following expression (5).

$$dEout/dt=(Ein-Eout)\times qf/V2 \quad (5)$$

By Laplace transforming and organizing equation (5) above, a transfer function from the alcohol concentration Ein of fuel flowing into the delivery pipe 26 up to the alcohol concentration Eout of fuel flowing out of the delivery pipe 26 becomes a first order delay, and a time constant T2 is represented by the following expressions using the volume V2 and the flow speed qf.

$$T2=V2/qf(s)$$

$$Eout(s)/Ein(s)=1/(T2\times s+1)$$

$$T2=V2/qf \quad (6)$$

Although the time constant T2 in expression (6) above is time varying due to the changing of the flow rare qf, and requires numerical calculation, time base t is converted to the integrated flow rate so as to make the numerical calculation unnecessary. The integrated flow rate is defined as Qf, as in the case of the fuel supply pipe.

$$Qf = \int_0^t qf \, dt$$

This equation is differentiated with respect to time t as follows.

$$dQf/dt = qf$$

The following expression is obtained by assigning the above expression to expression (5) above and organizing it in an appropriate manner.

$$Eout = \int_0^{Qf}(Ein - Eout) \, dQf$$

By Laplace transforming and organizing this equation, the transfer function becomes a first order delay, and the time constant T2 becomes a fixed value of V2.

$$Eout(s)/Ein(s) = 1/(T2s+1)$$

$$T2 = V2$$

Thus, by converting the time base t into the integrated flow rate Qf, the dead time delay T1 of the fuel supply pipe 25 becomes a fixed value (T1=V1) from the capacity V1 of the fuel supply pipe 25, and the time constant T2 of the first order delay of the delivery pipe 26 becomes a fixed value (T2=V2) from the capacity V2 of the delivery pipe 26. As a result, it becomes unnecessary to perform numeric calculation in accordance with the change in the flow speed qf of fuel.

Figure 7A:
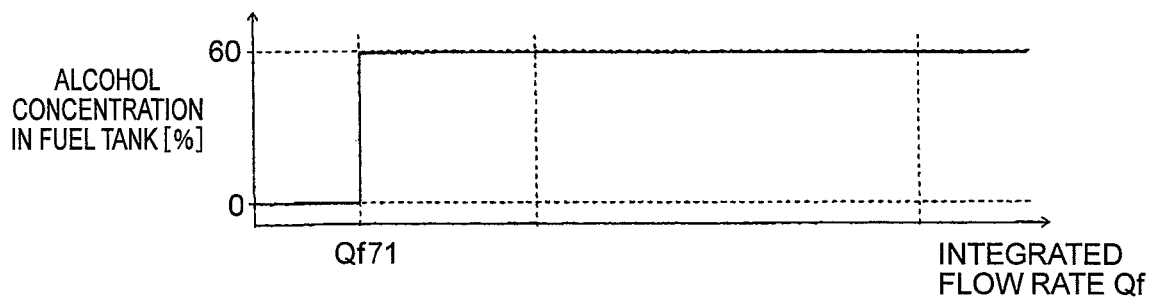
FIGS. 7A and 7B are time charts for explaining a delay in change of an alcohol concentration in injectors with respect to that in a fuel tank.
Figure 7B:
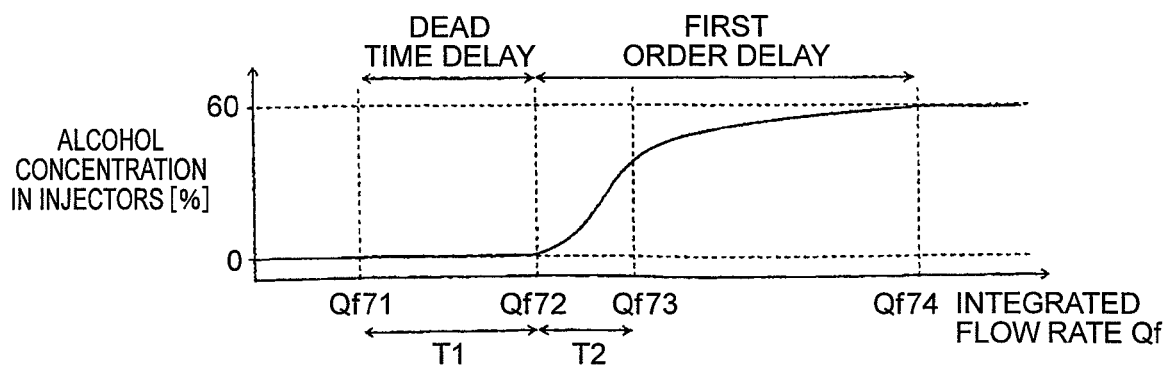

Timing charts for the delay of the alcohol concentration change are shown in FIGS. 7A and 7B. FIG. 7A shows the alcohol concentration in the fuel tank 20 and FIG. 7B shows the alcohol concentration in the injectors 21. In these figures, the time base t is converted to the integrated flow rate Qf. A fuel of a high alcohol concentration is supplied to the fuel tank 20 by being refueled at an integrated flow rate Qf71, so that the alcohol concentration in the fuel tank 20 becomes higher in a stepwise manner. On the other hand, the alcohol concentration of fuel in the injectors 21 changes with the above-mentioned dead time delay and the filter delay like a first order delay. When the axis of abscissa denotes the integrated flow rate, the dead time T1 becomes equal to the capacity V1 of the fuel supply pipe 25, and the first order time constant T2 becomes equal to the capacity V2 of the delivery pipe 26.

The setting of the above-mentioned alcohol concentration change delay coefficient KRT as shown in FIG. 5 is made by representing the integrated flow rate on the axis of abscissa, and setting the fuel replacement or refueling time point as a zero point of the integrated flow rate, in such a manner that the dead time and the first order behavior of the alcohol concentration change in the injectors 21 are shown with respect to the stepwise change of the alcohol concentration in the fuel tank 20. Thus, because the axis of abscissa represents the integrated flow rate, the set values of the dead time T1 and the first order delay T2 can be made fixed values without the need to change them with respect to the change of the flow rate qf, as a result of which the dead time and the first order behavior of the alcohol concentration change in the injectors 21 can be calculated or obtained from the simple one-dimensional map without performing numerical calculation.

Although the set value of the above-mentioned alcohol concentration change delay coefficient KRT as shown in FIG. 5 can be set from the above-mentioned arithmetic expression of the dead time T1 and the first order delay time constant T2 on the desk plan, it may be set by using the delay of the alcohol concentration change measured by experiments because a difference or error will occur with the arithmetic expression due to the shapes of the actual fuel supply pipe 25 and the delivery pipe 26 for fuel supply to the injectors 21.

Figure 8:
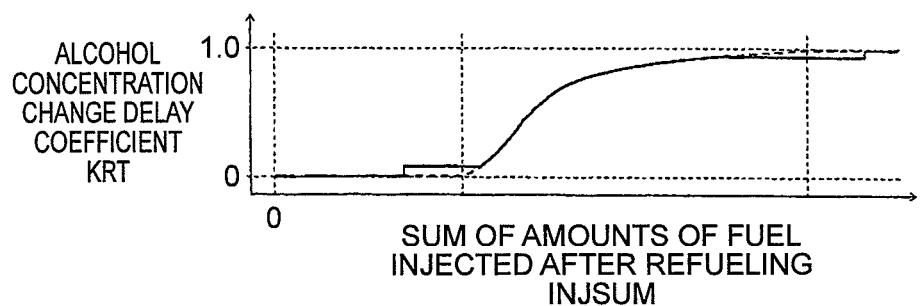
FIG. 8 is a view showing another example of a two-dimensional map of a sum of amounts of fuel injected after refueling and an alcohol concentration change delay coefficient in the control apparatus for an internal combustion engine according to the present invention.

In addition, as shown in FIG. 8, the alcohol concentration change delay coefficient KRT in a first predetermined range of the dead time delay before the first order delay starts may be set greater than 0 so as to provide a margin for the start timing of the alcohol concentration change. Also, the alcohol concentration change delay coefficient KRT in a second predetermined range after the filter delay like the first order delay ends may be set smaller than 1 so as to provide a margin for the end timing of the alcohol concentration change. In this manner, by setting the start and end timing of the alcohol concentration change with the appropriate margins, it is possible to cope with the case in which there occurs an error in estimating the start and/or end timing of the alcohol concentration change based on the alcohol concentration change delay coefficient KRT.

Figure 9:
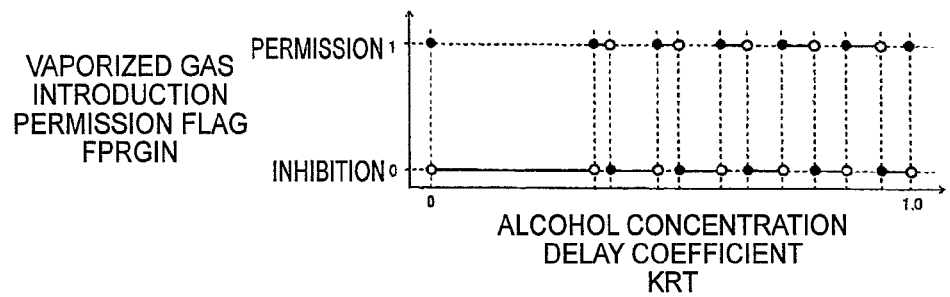
FIG. 9 is a view showing one example of a two-dimensional map of the alcohol concentration change delay coefficient and a vaporized gas introduction permission flag in the control apparatus for an internal combustion engine according to the present invention.

In step 406, it is determined whether an introduction condition of the vaporized gas holds. A vaporized gas introduction permission flag FPRGIN is calculated in accordance with the alcohol concentration change delay coefficient KRT by using a two-dimensional map (stored in the ECU 35), as shown in FIG. 9. Here, note that the vaporized gas introduction permission flag FPRGIN being equal to zero (FPRGIN=0) denotes inhibition of the vaporized gas introduction, and the vaporized gas introduction permission flag FPRGIN being equal to 1 (FPRGIN=1) denotes the permission of the vaporized gas introduction. When the vaporized gas is introduced, the air fuel ratio of a mixture supplied to the engine 10 is varied, so there occurs an influence of the air fuel ratio variation other than the alcohol concentration on the air fuel ratio correction coefficient KFB, and the accuracy of the alcohol concentration learning will be reduced. Therefore, when the alcohol concentration changes, it is desirable to perform the alcohol concentration learning while inhibiting the introduction of the vaporized gas. However, if the introduction of the vaporized gas is inhibited at all times during the alcohol concentration is changing, a sufficient flow rate of the vaporized gas being introduced might not be ensured, and the adsorption capacity of the canister 8, which serves to adsorb the vaporized gas, might be exceeded, thus giving rise to a fear that the vaporized gas could be released into the atmosphere thereby to generate air contamination. Accordingly, it is required to introduce the vaporized gas while interrupting the alcohol concentration learning as much as possible even during the alcohol concentration is changing. Particularly, in case of a small amount of intake air such as idling, etc., the amount of fuel consumption is low, and the duration in which the alcohol concentration is changing becomes longer, and the time of inhibiting the introduction of the vaporized gas is lengthened.

In contrast, in this embodiment of the invention, the alcohol concentration in the fuel tank 20, which has first changed and then become stabilized soon after the fuel tank 20 has been refilled, is learned, so it is possible to stabilize the learned value of the alcohol concentration in a short period of time after start of the learning. Accordingly, the alcohol concentration in the fuel tank 20 is learned and the learned value thereof is stabilized by inhibiting the introduction of the vaporized gas for a certain period of time after the start of the alcohol concentration change in accordance with the alcohol concentration change delay coefficient KRT as shown in FIG. 9. Thereafter, even if the alcohol concentration learning is interrupted, it is possible to calculate the alcohol concentration in the injectors 21 in an accurate manner from the stabilized alcohol concentration in the fuel tank 20 and from the estimated delay of the alcohol concentration change from the fuel tank 20 up to the injectors 21. As a result, the vaporized gas can be introduced and the alcohol concentration learning can be interrupted even during the alcohol concentration is changing. In FIG. 9, it is set such that the vaporized gas is intermittently introduced in accordance with the alcohol concentration change delay coefficient KRT, and an appropriate frequency of learning is kept after the stabilization of the alcohol concentration learning in the fuel tank 20, whereby the accuracy of the final learned value at the end of the alcohol concentration change in the injectors 21 can be improved.

Figure 10:
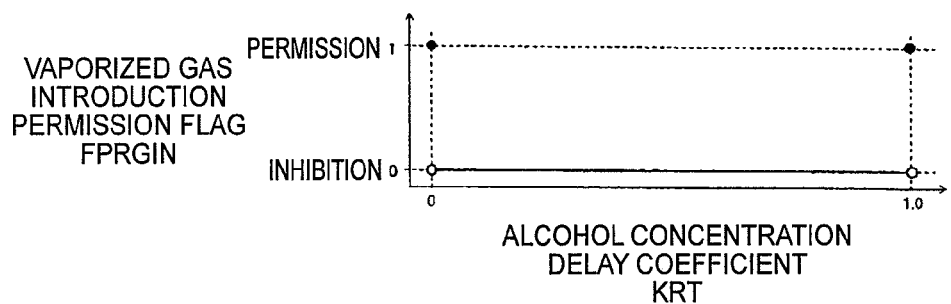
FIG. 10 is a view showing another example of a two-dimensional map of the alcohol concentration change delay coefficient and a vaporized gas introduction permission flag in the control apparatus for an internal combustion engine according to the present invention.

When it is estimated from the alcohol concentration change delay coefficient KRT that the alcohol concentration is changing, as shown in FIG. 10, even if the introduction of purge gas is inhibited, the vaporized gas can be introduced during the dead time delay, so the flow rate of fuel can be increased.

Figure 11:
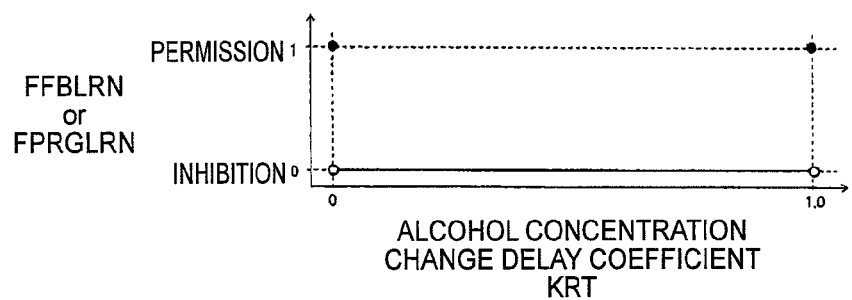
FIG. 11 is a view showing one example of a two-dimensional map of an update permission flag for the alcohol concentration change delay coefficient or a learning correction coefficient and an update permission flag for a vaporized gas introduction correction coefficient in the control apparatus for an internal combustion engine according to the present invention.

Then, in step 407, it is calculated whether a learned value update permission condition for the learning correction coefficient KLRN of the air fuel ratio feedback correction coefficient holds, and whether an update condition for the vaporized gas introduction correction coefficient KPRG holds. The update permission flag FFBLRN for the learning correction coefficient KLRN and the update permission flag FPRGLRN for the vaporized gas introduction correction coefficient KPRG are calculated in accordance with the alcohol concentration change delay coefficient KRT by using a two-dimensional map (stored in the ECU 35), as shown in FIG. 11. Here, FFBLRN and FPRGLRN=0 denote the inhibition of update, and FFBLRN and FPRGLRN=1 denote the permission of update. Because information of the air fuel ratio (feedback) correction coefficient KFB is used for updating the learning correction coefficient KLRN and the vaporized gas introduction correction coefficient KPRG, if updating of KLRN and KPRG is permitted when the air fuel ratio correction coefficient KFB is being varied due to the changing of the alcohol concentration, an error will occur in the calculation of KLRN and KPRG, as a result of which mislearning will occur in the alcohol concentration learning.

Accordingly, the occurrence of such an error is prevented by inhibiting the update of the vaporized gas introduction correction coefficient KPRG and the learning correction coefficient KLRN of the air fuel ratio feedback correction coefficient for a period of time in which it can be estimated from the alcohol concentration change delay coefficient KRT that the alcohol concentration is changing. As shown in FIG. 11, in a part (KRT=0) of the alcohol concentration change corresponding to the dead time, the alcohol concentration change is small, and the update is permitted. In addition, by inhibiting the update during changing of the alcohol concentration, the error is prevented. Thereafter, the update is permitted again at a time point at which the change of the alcohol concentration ends (KRT=1).

Moreover, even if the alcohol concentration is changing, the vaporized gas introduction correction coefficient KPRG may be updated when the vaporized gas is being introduced. Because the learned value of the alcohol concentration is caused to stabilize at an early stage, the accuracy of alcohol concentration estimation can be ensured even during interruption of the alcohol concentration learning. As a result, the estimation accuracy of the vaporized gas introduction correction coefficient KPRG can be improved, thereby making it possible to reduce the air fuel ratio variation during introduction of the vaporized gas. Further, during the learning of the alcohol concentration in the fuel tank 20, the introduction of the vaporized gas is inhibited, and the vaporized gas introduction correction coefficient KPRG is also reset to 1.0, so the accuracy of the alcohol concentration estimation is not influenced at all.

Figure 12:
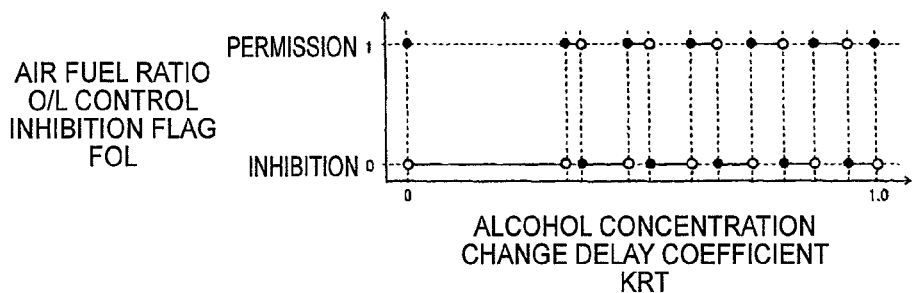
FIG. 12 is a view showing one example of a two-dimensional map of the alcohol concentration change delay coefficient and an air fuel ratio open-loop (O/L) control inhibition flag in the control apparatus for an internal combustion engine according to the present invention.

It step 408, an inhibition condition for air fuel ratio open-loop control is calculated from the alcohol concentration change delay coefficient KRT. An inhibition flag FOL for the air fuel ratio open-loop (O/L) control is calculated in accordance with the alcohol concentration change delay coefficient KRT by using a two-dimensional map (stored in the ECU 35), as shown in FIG. 12. The air fuel ratio open-loop control includes air fuel ratio enriching control under high load, air fuel ratio leaning control for improving fuel mileage, air fuel ratio enriching control after engine starting, and so on. FOL=1.0 denotes permission, and FOL=0.0 denotes inhibition. In case of FOL=0.0, the air fuel ratio feedback control for the stoichiometric air fuel ratio is forced to be performed. In the course of air fuel ratio open-loop control, air fuel ratio feedback control is inhibited and fuel supply is performed under open-loop control, so the estimation of the alcohol concentration according to the air fuel ratio correction coefficient KFB becomes unable to be carried out. Accordingly, when air fuel ratio open-loop control is performed during the time the alcohol concentration is changing, it becomes impossible to estimate the alcohol concentration, thus giving rise to variation in the air fuel ratio. In this embodiment, however, the alcohol concentration in the fuel tank 20, which has first changed and then become stabilized soon after the fuel tank 20 has been refilled, is learned, so it is possible to stabilize the learned value of the alcohol concentration in a short period of time after start of the learning. Accordingly, the learning of the alcohol concentration in the fuel tank 20 is carried out and the learned value thereof is stabilized by inhibiting the air fuel ratio open-loop control for a certain period of time after the start of the alcohol concentration change in accordance with the alcohol concentration change delay coefficient KRT, as shown in FIG. 12. Thereafter, even if the alcohol concentration learning is interrupted, it is possible to calculate the alcohol concentration in the injectors 21 in an accurate manner from the stabilized alcohol concentration in the fuel tank 20 and from the estimated delay of the alcohol concentration change from the fuel tank 20 up to the injectors 21. As a result, even during the alcohol concentration is changing, the air fuel ratio open-loop control can be permitted and the alcohol concentration learning can be interrupted. In FIG. 12, it is set such that the air fuel ratio open-loop control is intermittently inhibited in accordance with the alcohol concentration change delay coefficient KRT, and an appropriate frequency of learning is kept after the stabilization of the alcohol concentration learning in the fuel tank 20, whereby the accuracy of the final learned value at the end of the alcohol concentration change in the injectors 21 can be improved.

In step 409, it is determined whether an alcohol concentration learning condition holds. The alcohol concentration learning condition includes "during air fuel ratio feedback control", "not during purge introduction", "not during learning control on the characteristic variation of the fuel supply devices, and so on. When the alcohol concentration learning condition holds, the control process proceeds to step 410, whereas when the alcohol concentration learning condition does not hold, the control process proceeds to step 412. Thus, by inhibiting alcohol concentration learning during purge introduction or during learning control on the characteristic variation of the fuel supply devices, it is possible to perform the learning while separating the influence of the change of the alcohol concentration, the influence of the introduction of the vaporized gas, and the influence of the characteristic variation of the fuel supply devices, which are contained in or mixed with the air fuel ratio feedback correction coefficient, whereby the mislearning of the alcohol concentration learning can be prevented.

In step 410, it is determined from the alcohol concentration change delay coefficient KRT whether the alcohol concentration in the injectors 21 is changing. If 0<KRT<1.0, it can be estimated that the alcohol concentration is changing, so the control process proceeds to step 411 where an alcohol concentration learning permission flag FALLR is set to 1, which indicates the execution of the alcohol concentration learning. On the other hand, if KRT=0 or 1, it can be estimated that the alcohol concentration is not changing, so the control process proceeds to step 412 where the alcohol concentration learning permission flag FALLR is set to 0, which indicates the non-execution of the alcohol concentration learning. By setting the alcohol concentration learning permission flag FALLR in this manner, the alcohol concentration learning can be permitted only when the alcohol concentration in the injectors 21 is changing, whereby the learning accuracy can be improved while shortening the learning period.

When in step 413, the alcohol concentration learning permission flag FALLR is 1, the control process proceeds to step 414 where the alcohol concentration is updated, whereas when the alcohol concentration learning permission flag FALLR is 0, the control process proceeds to step 418 without updating the alcohol concentration.

Figure 13:
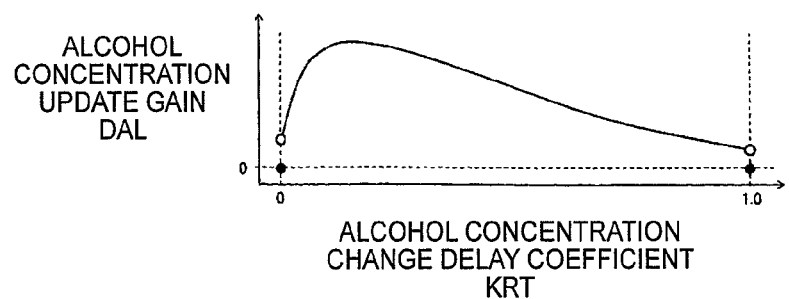
FIG. 13 is a view showing one example of a two-dimensional map of the alcohol concentration update coefficient and an alcohol concentration update gain in the control apparatus for an internal combustion engine according to the present invention.

In step 414, an update gain DAL for the alcohol concentration is calculated. The update gain DAL is calculated in accordance with the alcohol concentration change delay coefficient KRT by using a two-dimensional map (stored in the ECU 35), as shown in FIG. 13. The greater the change speed of the alcohol concentration change delay coefficient KRT, which changes in a manner like the first order delay, the greater the update gain DAL is set, so that it can follow the rapidly changing alcohol concentration, thereby making it possible to improve the response of the alcohol concentration estimation. In addition, maps showing much the same pattern are set for individual engine operating conditions in concert with the control period or cycle of the air fuel ratio feedback control that changes in accordance with the engine operating conditions so that the update behavior of the alcohol concentration becomes appropriately.

Further, in step 415, it is determined whether an integral term KI of the fuel feedback correction coefficient is equal to or greater than 0. When KI is equal to or greater than 0, an actual value of the alcohol concentration in the injectors 21 shows lower than an estimated value AL thereof, and the alcohol concentration ALNEW in the fuel tank 20 after the current refueling used for estimating the alcohol concentration in the injectors 21 shows low. Accordingly, in step 416, the alcohol concentration ALNEW in the fuel tank 20 after the current refueling is increased by the update gain DAL. On the other hand, when KI is smaller than 0, then in step 417, the alcohol concentration ALNEW in the fuel tank 20 after the current refueling is decreased by the update gain DAL.

In step 418, the alcohol concentration AL in the injectors 21 is calculated by the following expression.

$$AL \leftarrow ALOLD \times (1-KRT) + ALNEW \times KRT$$

where ALOLD is the alcohol concentration in the fuel tank 20 before the current refueling (i.e., after the last refueling); ALNEW is the alcohol concentration in the fuel tank 20 after the current refueling; and KRT is the alcohol concentration change delay coefficient representing the delay of the alcohol concentration change from the fuel tank 20 to the injectors 21.

In this manner, the alcohol concentration AL in the injectors 21 is estimated from the alcohol concentration in the fuel tank 20 before and after refueling and the concentration change delay due to the fuel supply system, and the alcohol concentration AL in the injectors 21 that is changing successively is not directly updated in real time. In addition, the alcohol concentration in the fuel tank 20 becomes uniform immediately after refueling by the stirring action of the fuel pump 22, so ALNEW, which is a learned value, is stabilized to a predetermined concentration immediately after the start of updating, and thus becomes stable at a very early time as compared with the changing AL. Moreover, the alcohol concentration change delay coefficient KRT is decided geometrically by the capacities of the fuel supply pipe 25 and the injector fuel supply delivery pipe 26 and the flow rates of fuel therein, so the calculation of the alcohol concentration AL in the injectors 21 can be made with a considerably high degree of accuracy, and the accuracy in the calculation of the alcohol concentration AL in the injectors 21 can be ensured immediately after the start of the update of ALNEW, and continue up to the end of the alcohol concentration change.

In addition, even in case where there is an error, due to some factors, in ALOLD that is the learned value of the alcohol concentration after the last refueling, as the alcohol concentration change is going to its end, KRT asymptotically approaches 1, whereby the proportion of ALOLD in AL is decreasing and the proportion of ALNEW in AL is increasing, so the learning accuracy of ALNEW is improving, and the estimation accuracy of AL at the end of the alcohol concentration change is kept high.

Figure 14:
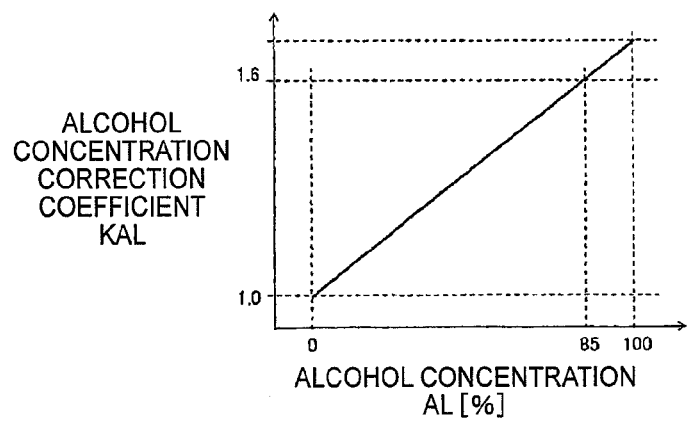
FIG. 14 is a view showing one example of a two-dimensional map of the alcohol concentration and an alcohol concentration correction coefficient in the control apparatus for an internal combustion engine according to the present invention.

In step 419, the alcohol concentration correction coefficient KAL for correcting the above-mentioned amount of fuel to be supplied Qfuel1 is calculated in accordance with the alcohol concentration AL, and the arithmetic calculation routine of FIG. 4 is terminated. The alcohol concentration correction coefficient KAL is calculated from the alcohol concentration AL by using a two-dimensional map (stored in the ECU 35), as shown in FIG. 14. The alcohol concentration correction coefficient KAL is set to 1.0 when the alcohol concentration AL is 0%, and in case where ethanol is used as alcohol, KAL is set to about 1.6 when AL is 85%.

Further, it is designed such that the alcohol concentrations ALOLD, ALNEW in the fuel tank 20 before and after the current refueling, which are the learned values of the alcohol concentration in the fuel tank 20, the amount of fuel injection INJSUM totalized or integrated after refueling, and the output of the fuel level gage 9 are held in the backup RAM or the EEPROM, and are not reset at the time when the engine is stopped or the power supply for the ECU 35 is turned off. In case where the backup RAM and the EEPROM are reset, the initial values of ALOLD, ALNEW are set to an intermediate value, such as about 40%, of the alcohol concentration. Because it is necessary to relearn the alcohol concentration, in the refueling determination in step 401, it is determined that refueling has been made, and the learning of the alcohol concentration is forced to start.

Moreover, the alcohol concentration AL thus estimated is used for various kinds of fuel control, ignition control, and so on. The various fuel control includes fuel control at the time of engine starting, fuel enriching control, fuel control upon acceleration and deceleration, etc. Also, the ignition control includes ignition timing calculation, control constant calculation for knock control, and so on.

Here, note that in steps 414 through 417, the integral term KI will deviate from 0 as a result of an error in ALNEW that is a learned value of the alcohol concentration in the fuel tank 20, so the alcohol concentration ALNEW in the fuel tank 20 is updated in a feedback manner by being increased and decreased depending upon whether KI is equal to or greater than (i.e., not less than) 0 or KI is less than 0, but the alcohol concentration in the fuel tank 20 may be directly estimated by further using the alcohol concentration change delay behavior of the fuel supply system in addition to the integral term KI of the air fuel ratio correction coefficient KFB.

That is, this is a method for obtaining the alcohol concentration in the injectors 21 from the integral term KI, and further obtaining the alcohol concentration in the fuel tank 20 from the alcohol concentration change delay behavior. The value of KAL×(1+KI) according to the alcohol concentration correction coefficient KAL and the integral term KI corresponds to a true alcohol concentration correction coefficient KAL for compensating for the current alcohol concentration in the injectors 21 from an alcohol concentration of 0%. Accordingly, a true alcohol concentration AL can be calculated by using the characteristic map of the alcohol concentration AL and the alcohol concentration correction coefficient KAL in FIG. 14.

$$AL \leftarrow MAP(KAL \times (1+KI))$$

In addition, by transforming the equation for estimating the alcohol concentration AL in the injectors 21 from the alcohol concentration ALNEW in the fuel tank 20 and the alcohol concentration change delay coefficient KRT in step 418, there is obtained the following expression that calculates the alcohol concentration ALNEW in the fuel tank 20 from the alcohol concentration AL in the injectors 21 and the alcohol concentration change delay coefficient KRT.

$$ALNEW \leftarrow (1-1/KRT)ALOLD - (1/KRT) \times AL$$

Accordingly, the current alcohol concentration ALNEW in the fuel tank 20 can be calculated by using the alcohol concentration AL in the injectors 21, which is calculated from the alcohol concentration correction coefficient KAL and the integral term KI, and using the above-mentioned alcohol concentration ALOLD at the time of the last refueling and the alcohol concentration change delay coefficient KRT Further, the arithmetic calculation for calculating the alcohol concentration AL in the injectors 21 from the alcohol concentration ALNEW uses the same processes as those used from step 418 to step 419.

The integral term KI always varies according to the feedback control, and the alcohol concentration learned value also vary, but such variations can be prevented by using the integral term KI that has been subjected to filtering processing, or using the learned value of the alcohol concentration in the fuel tank 20 which has been subjected to filtering processing.

Here, note that the oxygen concentration sensor 29 in FIG. 1 constitutes an air fuel ratio detection unit; steps 201 through 207 in FIG. 2 together constitute an air fuel ratio correction amount calculation unit; steps 401 through 405 in FIG. 4 together constitute a fuel concentration change delay behavior estimation unit; steps 406 through 417 together constitute an in-tank concentration learning unit; step 418 constitutes a supplied fuel concentration calculation unit; and step 419 constitutes a fuel control unit.

Next, the operation of the control apparatus for am internal combustion engine according to the present invention will be described by using timing charts in FIG. 15 and FIG. 16.

Figure 15:
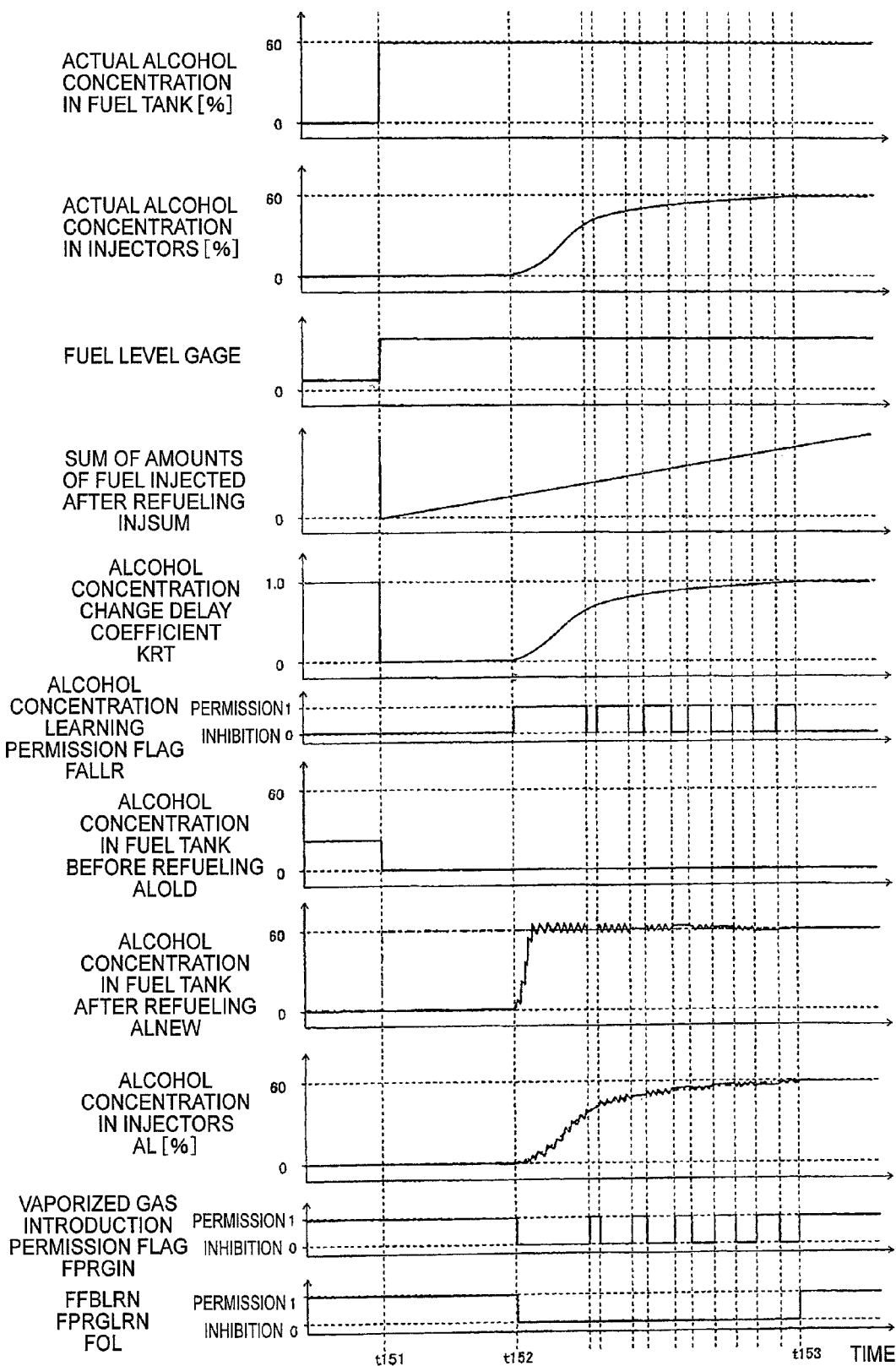
FIG. 15 is a timing chart for explaining one example of the operation of the control apparatus for an internal combustion engine according to the present invention.

First of all, FIG. 15 shows the behavior of the control apparatus in which the alcohol concentration in the fuel tank 20 before refueling is 0%, and alcohol fuel is refueled or refilled into the fuel tank 20 with the result that the alcohol concentration in the fuel tank 20 becomes 60%.

At time point t151, alcohol fuel is refueled into the fuel tank 20, and the actual alcohol concentration in the fuel tank 20 changes from 0% into 60%. On the other hand, owing to the delay in the fuel supply system, the actual alcohol concentration of the injectors 21 begins to change in a first order delay manner from time point t152 after the lapse of the dead time, and has completely changed at time point t153 by 100%, so that thus resulting in an alcohol concentration of 60%, which is the same as the alcohol concentration in the fuel tank 20.

Now, the processing in the ECU 35 will be described below. At time point t151, a refueling determination is made by the change in the fuel level gage 9 in the fuel tank 20 due to the refueling thereof, and the sum of amounts of fuel injected after the refueling (the totalized or integrated amount of fuel injected after the refueling) INJSUM is reset to 0, and the alcohol concentration ALOLD in the fuel tank 20 before the refueling is reset to the same value as ALNEW.

From time point t151 onward, the alcohol concentration change delay coefficient KRT for estimating the delay of the fuel supply system is going to be calculated in accordance with the increase of INJSUM, and after the integrated amount of fuel injection corresponding to the dead time has been reached, the alcohol concentration change delay coefficient KRT is changed in the first order delay manner from time point t152. When the alcohol concentration change delay coefficient KRT begins to change between from 0 to 1, it is estimated that the alcohol concentration in the injectors 21 changes, so the alcohol concentration learning permission flag FALLR is set to 1.0, and the learning of the alcohol concentration is permitted. On the other hand, during the time when the alcohol concentration in the injectors 21 is changing, by setting the update permission flags FFBLRN and FPRGLRN for the learned value KLRN of the characteristic variation of the fuel supply devices and the vaporized gas introduction correction coefficient KPRG to 0.0 thereby to inhibit updating thereof, it is possible to perform the learning while separating the influence of the change of the alcohol concentration, the influence of the introduction of the vaporized gas, and the influence of the characteristic variation of the fuel supply devices, which are contained in or mixed with the air fuel ratio feedback correction coefficient, whereby the mislearning of the alcohol concentration learning can be prevented. In addition, during the time the alcohol concentration is changing, it is necessary to perform the alcohol concentration learning while executing the air fuel ratio feedback control, so by setting the inhibition flag FOL for the air fuel ratio open-loop (O/L) control to 0, the air fuel ratio open-loop control is inhibited, and even if a fuel enriching condition or a fuel leaning condition holds, the air fuel ratio feedback control of the stoichiometric air fuel ratio is forced to be executed.

When the alcohol concentration learning starts, the alcohol concentration ALNEW in the fuel tank 20 after the last refueling converges to the actual concentration in a very short period of time in comparison with the concentration change in the injectors 21. This is because the alcohol concentration in the fuel tank 20 becomes a stable alcohol concentration immediately after refueling of the fuel tank 20 unlike the concentration change in the injectors 21. Moreover, the estimation of the alcohol concentration in the injectors 21 is performed based on the learned value of the alcohol concentration in the fuel tank 20 which converges and becomes stable immediately after the start of the learning, and the alcohol concentration change delay in the fuel supply system which can be accurately estimated from the above-mentioned geometrical relation, so the accuracy of the estimation or calculation of the alcohol concentration in the injectors 21 can be ensured immediately after the start of the learning.

Therefore, even if the vaporized gas is introduced and the alcohol concentration learning is interrupted in a period of time from time point t152 to time point t153 in which the alcohol concentration in the injectors 21 changes, high accuracy in the estimation of the alcohol concentration in the injectors 21 can be kept, and at the same time a sufficient flow rate of the vaporized gas being introduced can be ensured.

Figure 16:
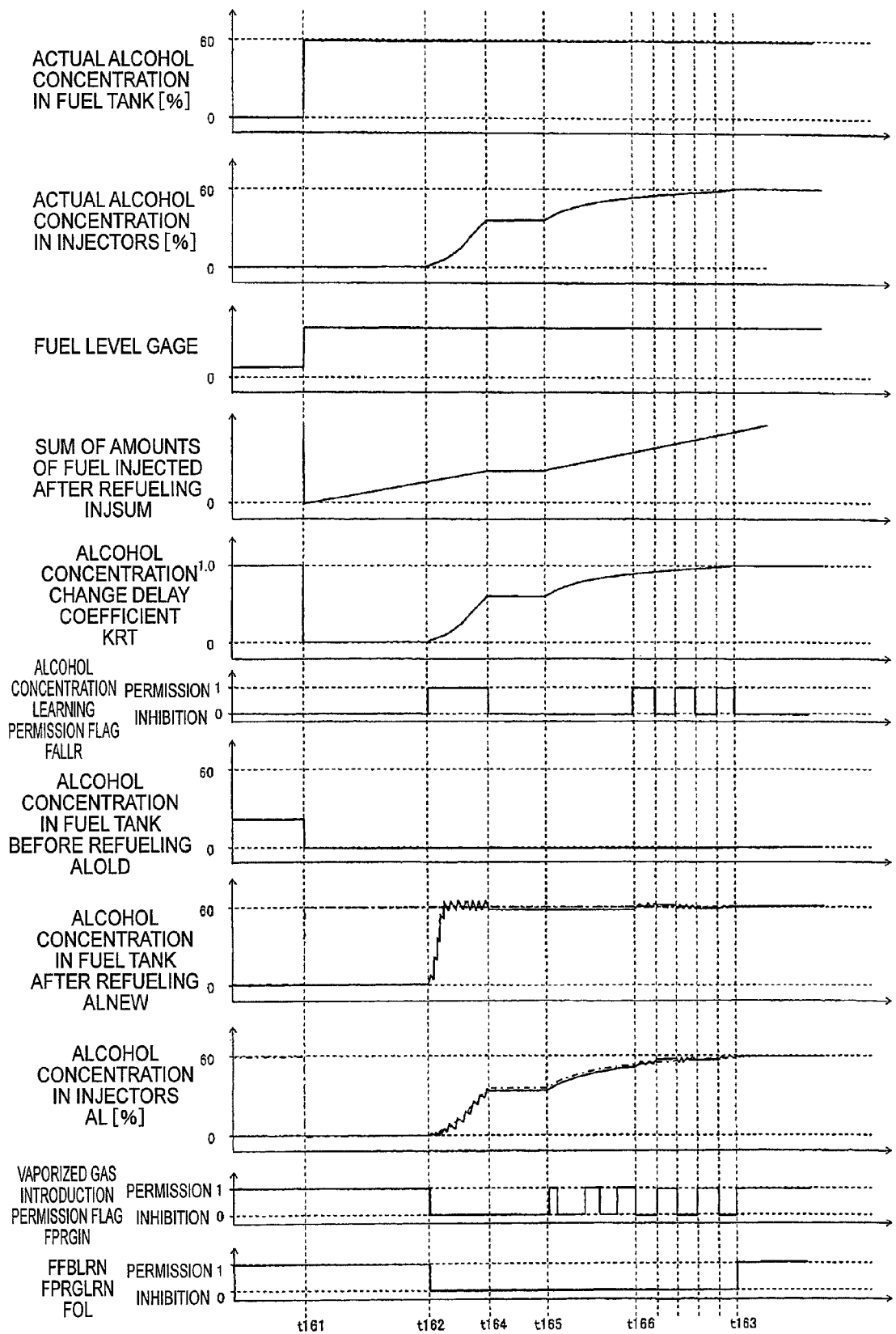
FIG. 16 is a timing chart for explaining another example of the operation of the control apparatus for an internal combustion engine according to the present invention.

In addition, FIG. 16 shows the case where engine stop and restart are performed during changing of the alcohol concentration. In this case, in contrast to FIG. 15, the engine is stopped at time point t164, and restarted at time point t165. From time point t164 to time point t165, the engine is stopped, so the totalized or integrated value of amounts of injected fuel does not increase stop and remains at a definite value, and the alcohol concentration change delay coefficient KRT does not change, either. After the restart of the engine at time point t165, the oxygen concentration sensor 29 has not been activated until time point t166, and air fuel ratio feedback control is interrupted. Therefore, the alcohol concentration learning is inhibited, and the update of the alcohol concentration ALNEW in the fuel tank 20 is stopped. However, the alcohol concentration in the injectors 21 is estimated by the alcohol concentration ALNEW in the fuel tank 20 of which the learned value converges at an early time after the start of the learning, and the alcohol concentration change delay coefficient KRT which can be accurately estimated from the above-mentioned geometrical relation, so it is possible to keep the estimation accuracy of the alcohol concentration in the injectors 21 which continues to change during the time when the alcohol concentration learning is stopped.

Even if a linear type oxygen concentration sensor having a linear output with respect to the air fuel ratio change of the exhaust gas is used as the oxygen concentration sensor, air fuel ratio feedback control can be carried out, and the alcohol concentration in the injectors 21 can be estimated, thus making it possible to provide similar advantageous effects.

Moreover, in the case of using the linear type oxygen concentration sensor, in air fuel ratio enriching or leaning control other than stoichiometric air fuel ratio control, too, the estimation of the alcohol concentration can be made by executing air fuel ratio feedback control while setting the target air fuel ratio to a rich or lean value. At this time, even during changing of the alcohol concentration, air fuel ratio feedback control for enriching or leaning the air fuel ratio of a mixture to be supplied to the injectors 21 is performed, and enriching and leaning control is not inhibited.

Further, in case where a plurality of delivery pipes for supplying fuel to a plurality of injector groups are provided for a plurality of cylinder groups, respectively, the shapes and the lengths of fuel supply pipes can vary for the individual injector fuel supply delivery pipes, respectively, and hence delays from the fuel tank to the individual injectors can become different from one another. Accordingly, alcohol concentration change delay coefficients KRT may be calculated for the individual injector fuel supply delivery pipes, respectively, and alcohol concentrations AL and alcohol concentration correction coefficients KAL may also be calculated for the individual delivery pipes, respectively, so that fuel correction can be made with the use of these values thus calculated.

In addition, the construction of the fuel supply system is a returnless type one in which no pressure regulator exist in the downstream side of the fuel supply delivery pipe, but even if the present invention is applied to a return type fuel supply system that has a pressure regulator in the fuel supply delivery pipe, there is a delay in the alcohol concentration change from the fuel tank to the injectors, and such a delay includes a dead time delay and a filter delay like a first order delay, as a result of which similar advantageous effects can be achieved.

Although the description has been made by using proportional and integral calculations for air fuel ratio feedback control, any method for performing air fuel ratio feedback control based on the detected air fuel ratio of the oxygen concentration sensor can estimate the alcohol concentration by using a fuel (air fuel ratio) correction coefficient, and hence similar advantageous effects can be obtained.

Further, the oxygen concentration sensor need only be a sensor that can detect the air fuel ratio of the exhaust gas, and hence, even with the use of a linear type air fuel ratio sensor, a NOx sensor, an HC sensor, a CO sensor, and so on, air fuel ratio feedback control can be carried out, and the alcohol concentration estimation can be made. Thus, similar advantageous effects can be achieved.

Thus, the alcohol concentration in the fuel tank, which has first changed and then become stabilized immediately after the fuel tank has been refilled, is learned by means of the air fuel ratio feedback correction coefficient, so it is possible to stabilize the learned value of the alcohol concentration in a short period of time after the start of the learning, whereby the alcohol concentration in an injector is calculated from the stabilized alcohol concentration in the fuel tank and the estimated delay in the change of the alcohol concentration along a fuel path from the fuel tank to the injector, thus making it possible to calculate the alcohol concentration in the injector in an accurate manner even if the learning of the alcohol concentration is interrupted due to stopping of the engine, introduction of the vaporized gas, and air fuel ratio open-loop control. In addition, accuracy in the alcohol concentration is maintained, so the introduction of vaporized gas and the air fuel ratio open-loop control can be permitted even during the time when the alcohol concentration in the injector is changing.

While the invention has been described in terms of a preferred embodiment, those skilled in the art will recognize that the invention can be practiced with modifications within the spirit and scope of the appended claims.

What is claimed is:

1. A control apparatus for an internal combustion engine which learns a concentration of a single composition of fuel in a fuel tank according to air fuel ratio feedback control, estimate a composition concentration change delay from the fuel tank to a fuel supply device, and calculates a concentration of said composition in said fuel supply device, said apparatus comprising:

an air fuel ratio detection unit that is arranged in an exhaust system of said internal combustion engine for detecting an air fuel ratio in an exhaust gas from said internal combustion engine;

an air fuel ratio correction amount calculation unit that calculates an amount of air fuel ratio correction for correcting an amount of fuel to be supplied in said fuel supply device based on the air fuel ratio detected by said air fuel ratio detection unit;

an in-tank concentration learning unit that estimates the concentration of the single composition of fuel in said fuel tank based on the amount of air fuel ratio correction calculated by said air fuel ratio correction amount calculation unit;

a fuel concentration change delay behavior estimation unit that estimates a delay behavior of a concentration change of the single composition until the fuel in said fuel tank, of which the concentration of the single composition has been changed due to refueling of said fuel tank, arrives at said fuel supply device;

a supplied fuel concentration calculation unit that calculates the single composition concentration of fuel to be supplied to the internal combustion engine, from the single composition concentration of the fuel in the fuel tank learned by said in-tank concentration learning unit and the delay behavior of the single composition concentration change estimated by said fuel concentration change delay behavior estimation unit; and a fuel control unit that calculates a single composition concentration correction coefficient based on the supplied fuel concentration calculated by said supplied fuel concentration calculation unit, and corrects the amount of fuel supplied to the internal combustion engine by said single composition concentration correction coefficient thus calculated.

2. A control apparatus for an internal combustion engine which learns a concentration of a single composition of fuel in a fuel tank according to air fuel ratio feedback control, estimate a concentration change delay from the fuel tank to a fuel supply device, and calculates a concentration of said composition in said fuel supply device, said apparatus comprising:

an air fuel ratio detection unit that is arranged in an exhaust system of said internal combustion engine for detecting an air fuel ratio in an exhaust gas from said internal combustion engine;

a fuel concentration change delay behavior estimation unit that estimates a delay behavior of a concentration change of the single composition until the fuel in said fuel tank, of which the concentration of the single composition has been changed due to refueling of said fuel tank, arrives at said fuel supply device;

an air fuel ratio correction amount calculation unit that calculates an amount of air fuel ratio correction for correcting an amount of fuel to be supplied in said fuel supply device based on the air fuel ratio detected by said air fuel ratio detection unit;

an in-tank concentration learning unit that estimates the concentration of the single composition of fuel in said fuel tank based on the amount of air fuel ratio correction calculated by said air fuel ratio correction amount calculation unit and the delay behavior of the single composition concentration change estimated by said fuel concentration change delay behavior estimation unit;

a supplied fuel concentration calculation unit that calculates the single composition concentration of fuel to be supplied to the internal combustion engine, from the single composition concentration of the fuel in the fuel tank learned by said in-tank concentration learning unit and the delay behavior of the single composition concentration change estimated by said fuel concentration change delay behavior estimation unit; and a fuel control unit that calculates a single composition concentration correction coefficient based on the supplied fuel concentration calculated by said supplied fuel concentration calculation unit, and corrects the amount of fuel supplied to the internal combustion engine by said single composition concentration correction coefficient thus calculated.

3. The control apparatus for an internal combustion engine as set forth in claim 1 or 2, wherein said fuel concentration change delay behavior estimation unit estimates the fuel concentration change delay behavior in accordance with a totalized amount of fuel after refueling of said fuel tank that is obtained by summing amounts of fuel supplied to said internal combustion engine from a time point at which it is determined that fuel has been refueled into said fuel tank.

4. The control apparatus for an internal combustion engine as set forth in claim 1 or 2, wherein said fuel concentration change delay behavior estimation unit estimates, based on a dead time delay and a filtering delay, the delay behavior of the single composition concentration change until the fuel in said fuel tank, of which the concentration of the single composition has been changed due to refueling of said fuel tank, arrives at said fuel supply device.

5. The control apparatus for an internal combustion engine as set forth in claim 1 or 2, wherein said supplied fuel concentration calculation unit calculates the concentration of the single composition of the fuel supplied to the internal combustion engine based on the concentration of the fuel in the fuel tank before refueling thereof that has been calculated before refueling of fuel by said in-tank concentration learning unit, the concentration of the fuel in the fuel tank after refueling thereof that has been calculated after refueling of fuel by said in-tank concentration learning unit, and the single composition concentration change delay behavior estimated by said fuel concentration change delay behavior estimation unit.

6. The control apparatus for an internal combustion engine as set forth in claim 1 or 2, wherein when it is estimated by said fuel concentration change delay behavior estimation unit that the fuel concentration changes, the update of the fuel concentration in said fuel tank by the in-tank concentration learning unit is permitted.

7. The control apparatus for an internal combustion engine as set forth in claim 1 or 2, wherein when it is estimated by said fuel concentration change delay behavior estimation unit that the fuel concentration changes, the update of a vaporized gas introduction correction coefficient for correcting an air fuel ratio change due to the introduction of a vaporized gas is inhibited.

8. The control apparatus for an internal combustion engine as set forth in claim 1 or 2, wherein when it is estimated by said fuel concentration change delay behavior estimation unit that the fuel concentration changes, the update of an air fuel ratio learning correction coefficient, which learns an air fuel ratio correction amount calculated by said air fuel ratio correction amount calculation unit according to integral processing or filtering processing thereby to correct the amount of fuel to be supplied, is inhibited.

9. The control apparatus for an internal combustion engine as set forth in claim 1 or 2, wherein the introduction timing of a vaporized gas is calculated in accordance with the delay behavior of the single composition concentration change calculated by said fuel concentration change delay behavior estimation unit.

10. The control apparatus for an internal combustion engine as set forth in claim 1 or 2, wherein the introduction of a vaporized gas is inhibited for a period of time from start of the single composition concentration change by said fuel concentration change delay behavior estimation unit until the learned value of the fuel concentration in said fuel tank becomes stabilized.

11. The control apparatus for an internal combustion engine as set forth in claim 1, wherein the introduction timing of a vaporized gas is calculated in accordance with the delay behavior of the single composition concentration change calculated by said fuel concentration change delay behavior estimation unit, and the update of the fuel concentration in said fuel tank by said in-tank concentration learning unit is inhibited during the introduction of the vaporized gas.

12. The control apparatus for an internal combustion engine as set forth in claim 1 or 2, wherein
in said in-tank concentration learning unit, an update gain by which the fuel concentration in the fuel tank is updated in accordance with the air fuel ratio correction amount calculated by said air fuel ratio correction amount calculation unit is caused to change in accordance with the delay behavior of the single composition concentration change calculated by said fuel concentration change delay behavior estimation unit.

13. The control apparatus for an internal combustion engine as set forth in claim 1 or 2, wherein
the fuel feedback control performed by said air fuel ratio correction amount calculation unit is forced to be executed in accordance with the delay behavior of the single composition concentration change calculated by said fuel concentration change delay behavior estimation unit.

14. The control apparatus for an internal combustion engine as set forth in claim 1 or 2, wherein
the fuel feedback control performed by said air fuel ratio correction amount calculation unit is forced to be executed for a period of time from start of the concentration change by said fuel concentration change delay behavior estimation unit until the learned value of the fuel concentration in said fuel tank becomes stabilized.

\* \* \* \* \*